Feb. 15, 1966  S. O. RODESEIKE  3,235,044
SPRING OPERATOR MANUAL CHARGING MEANS
Filed June 24, 1963  10 Sheets-Sheet 1

INVENTOR.
SIGURD O. RODESEIKE
BY
OSTROLENK, FABER, GERB & SOFFEN
ATTORNEYS

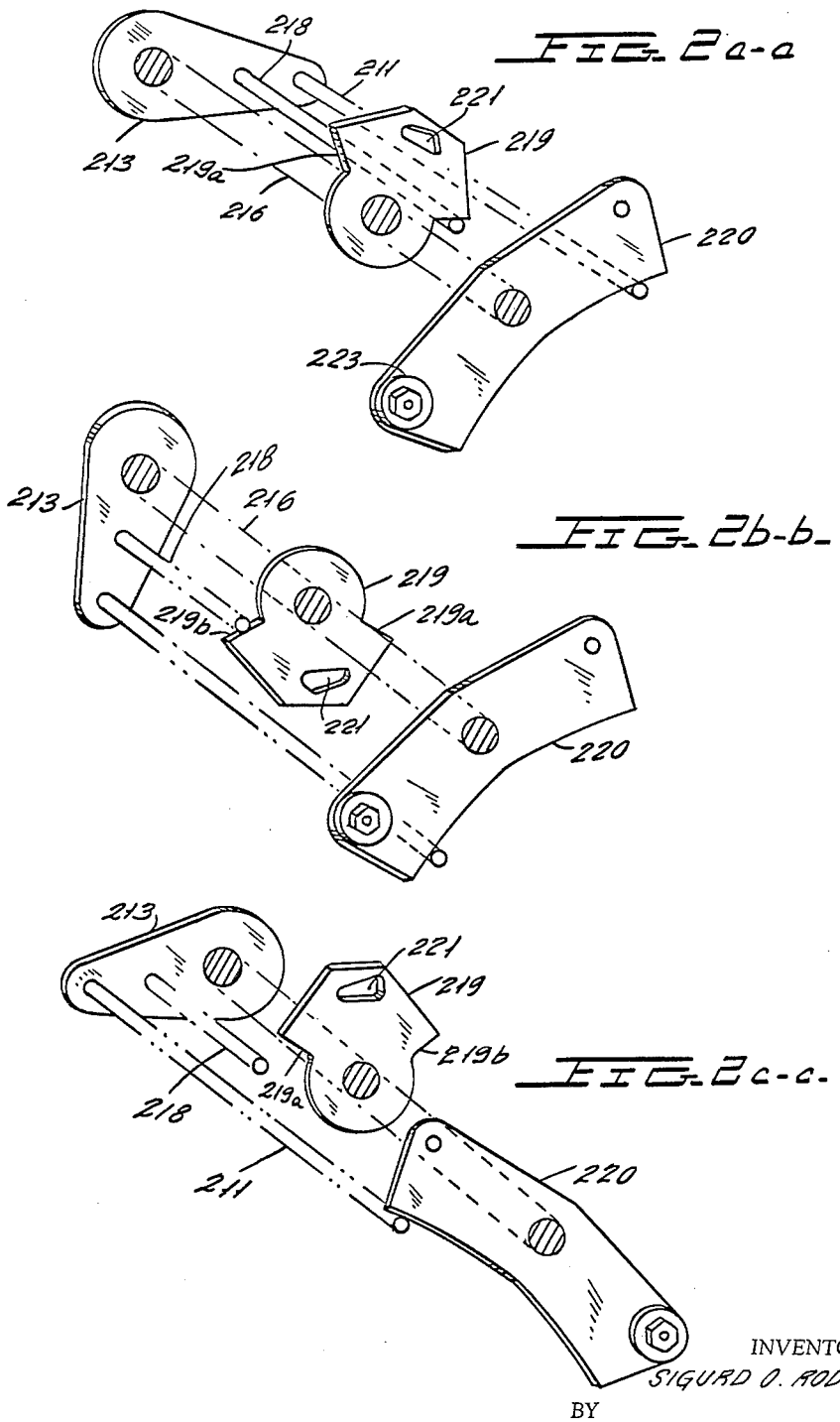

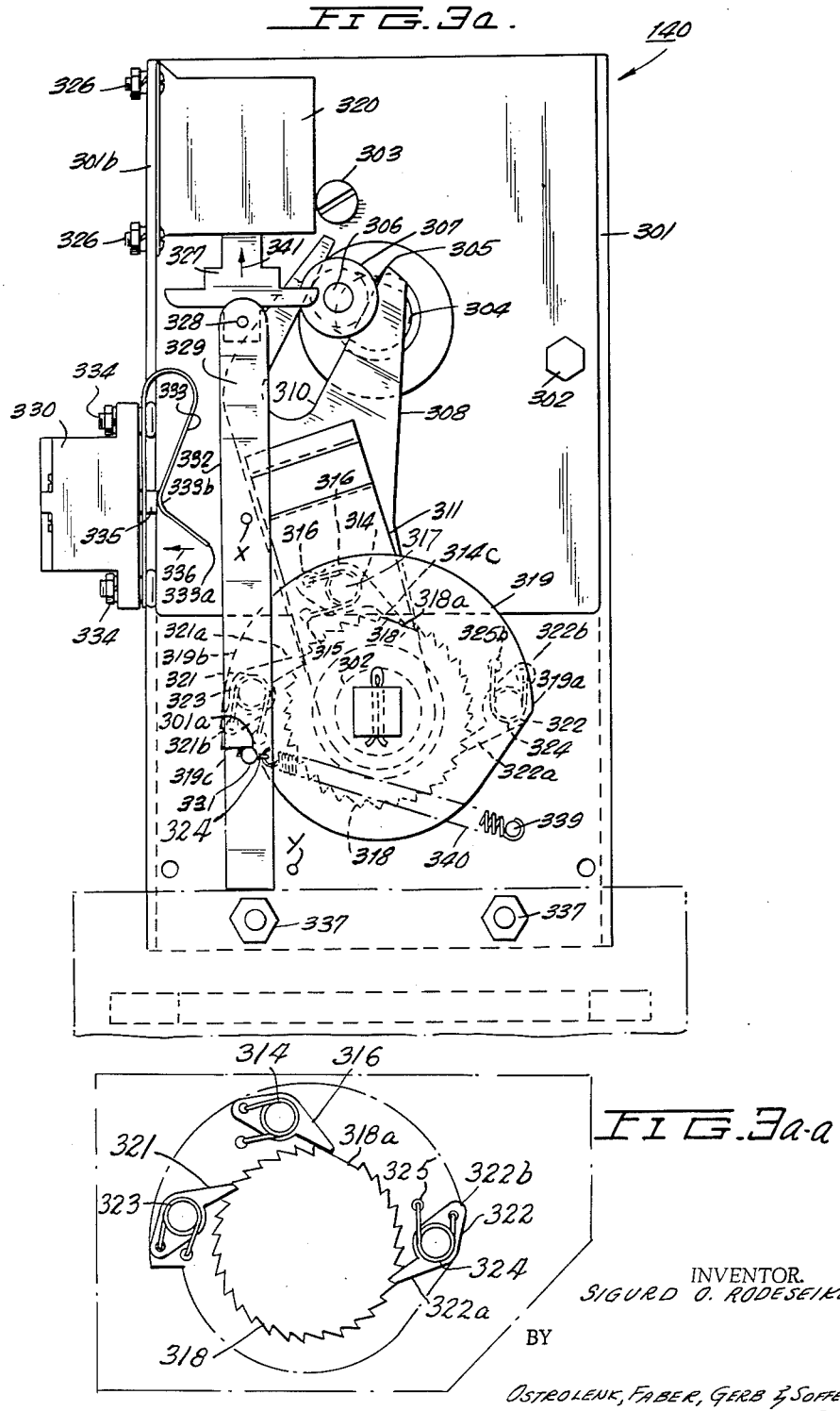

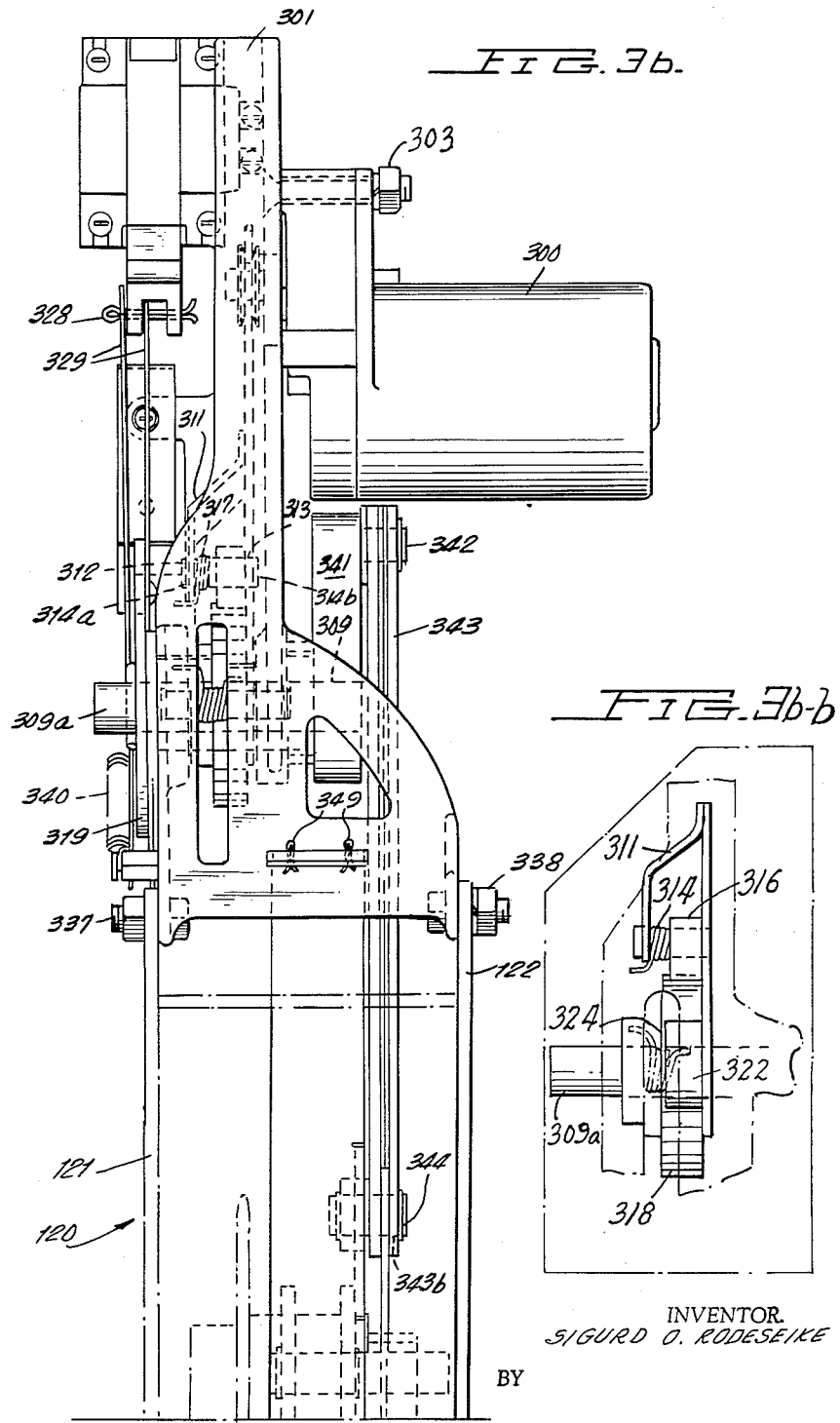

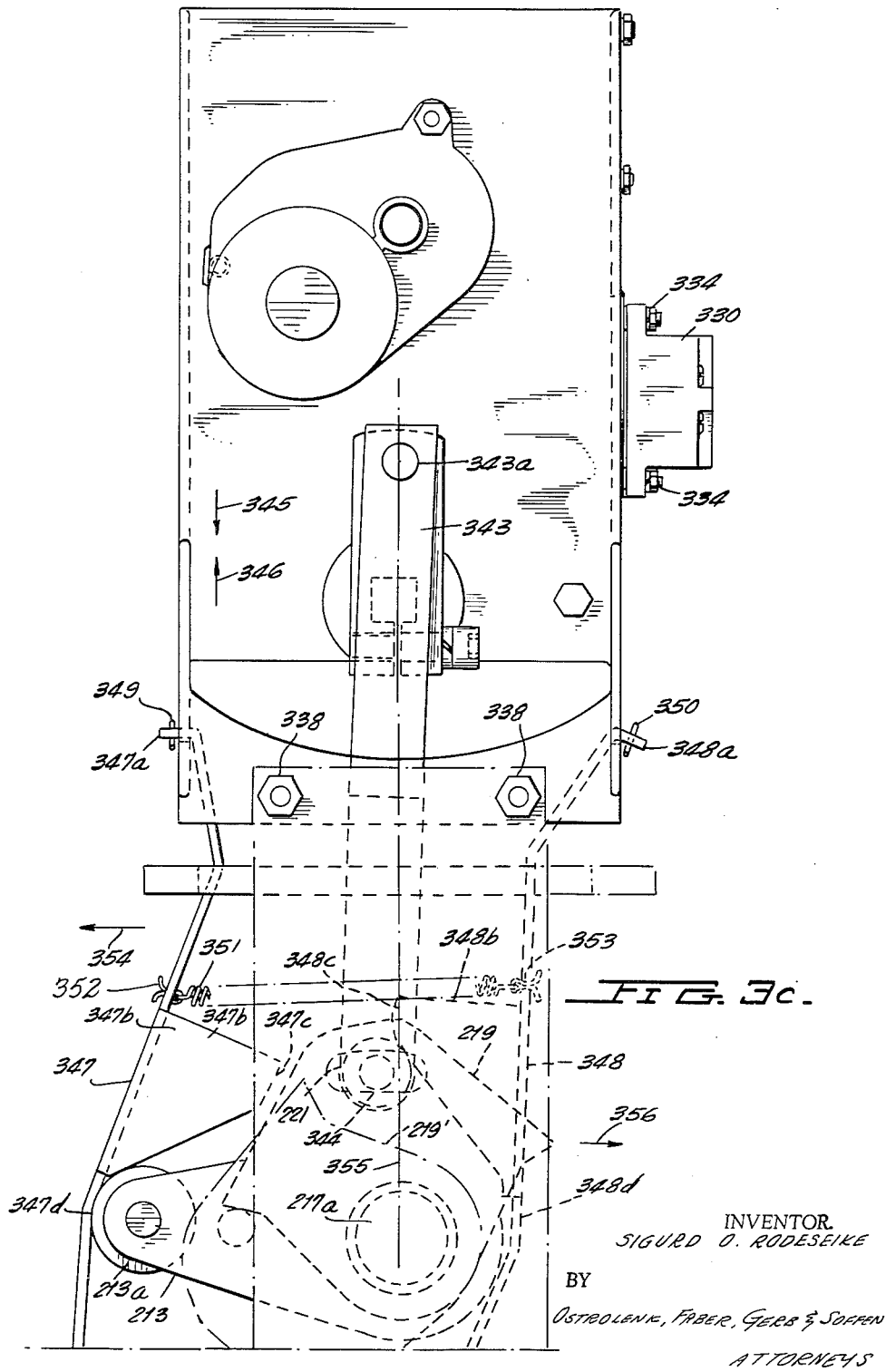

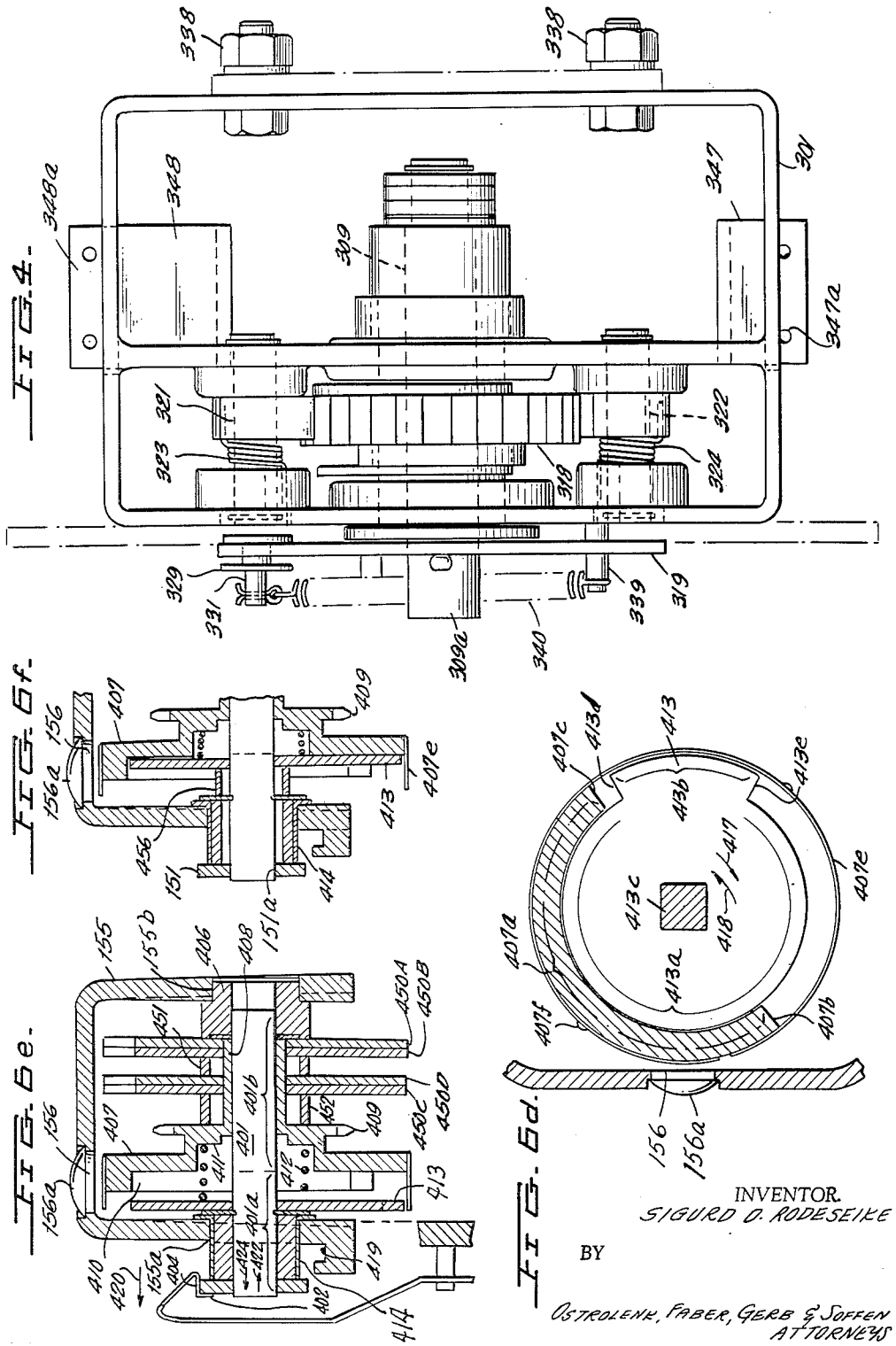

Feb. 15, 1966 S. O. RODESEIKE 3,235,044
SPRING OPERATOR MANUAL CHARGING MEANS
Filed June 24, 1963 10 Sheets-Sheet 7
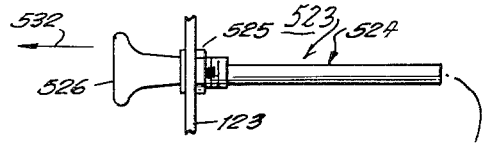
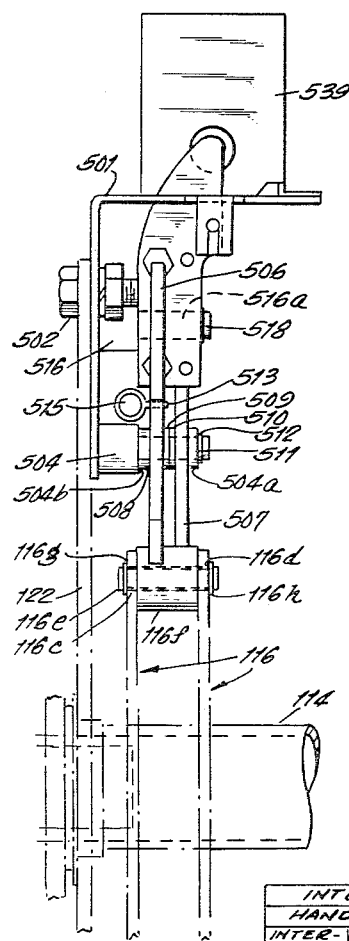
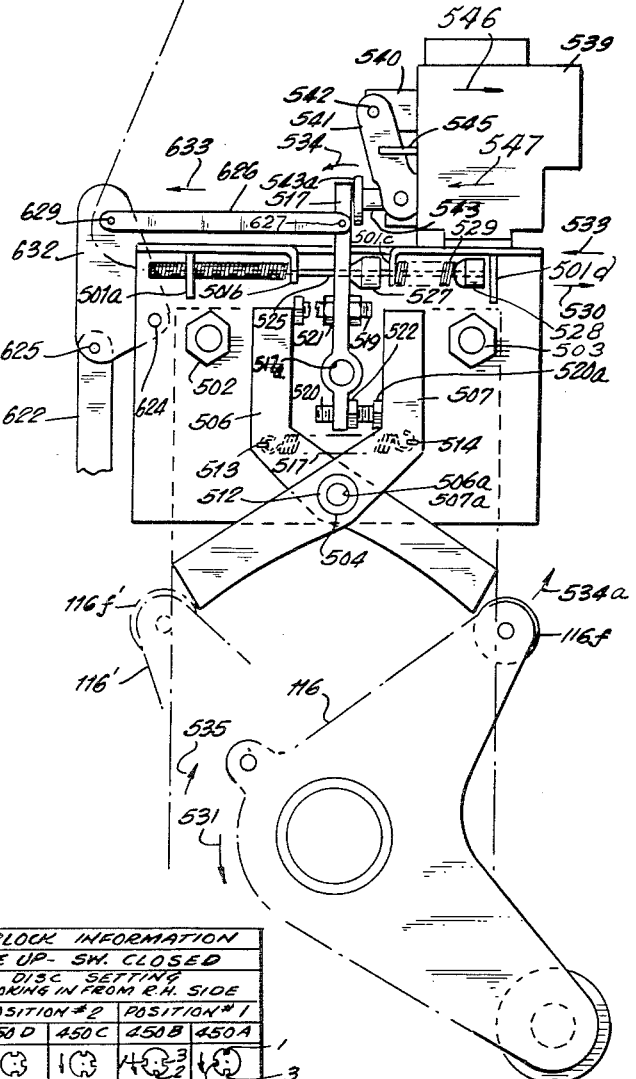
INVENTOR.
SIGURD O. RODESEIKE
BY
OSTROLENK, FABER, GERB & SOFFEN
ATTORNEYS

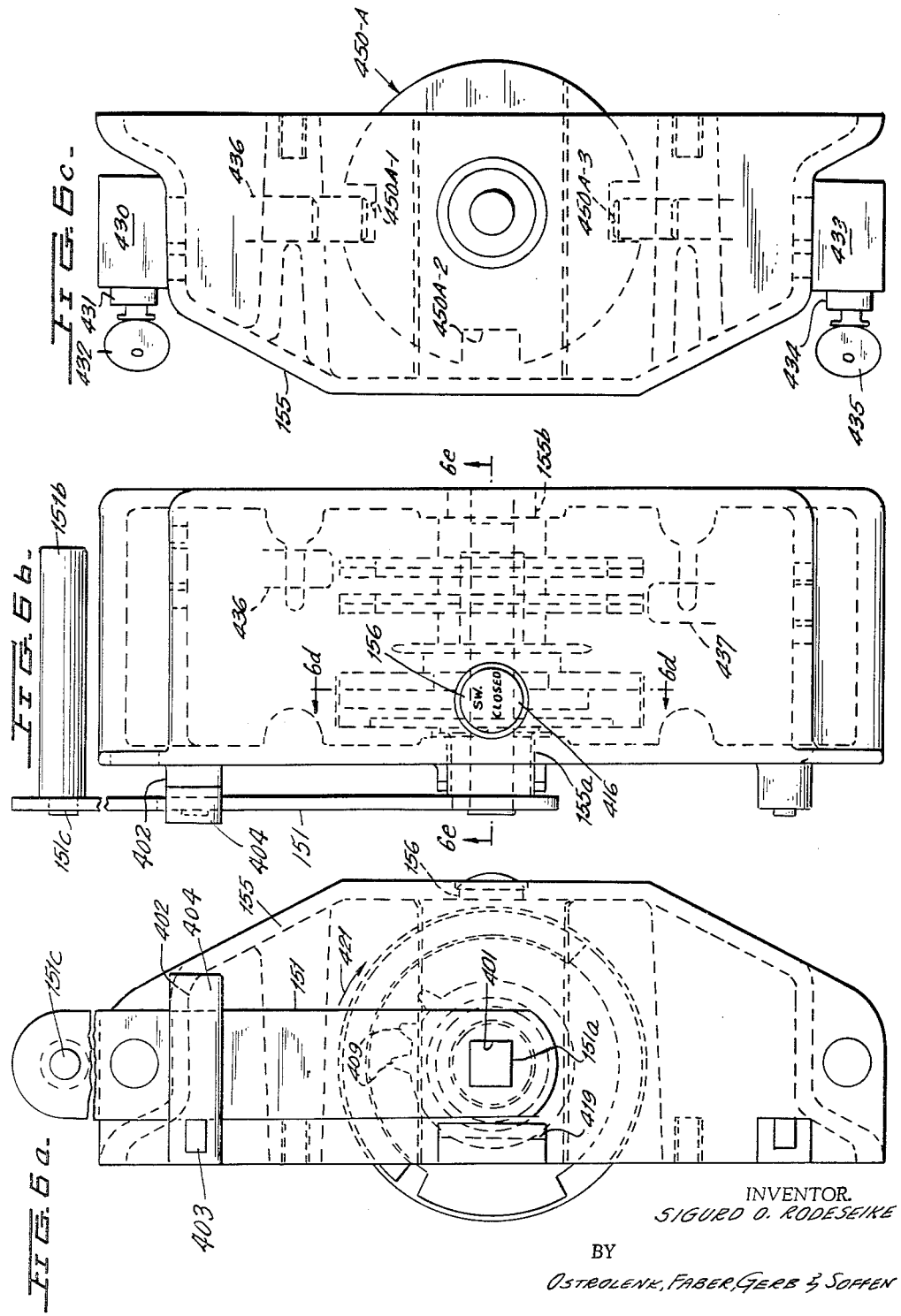

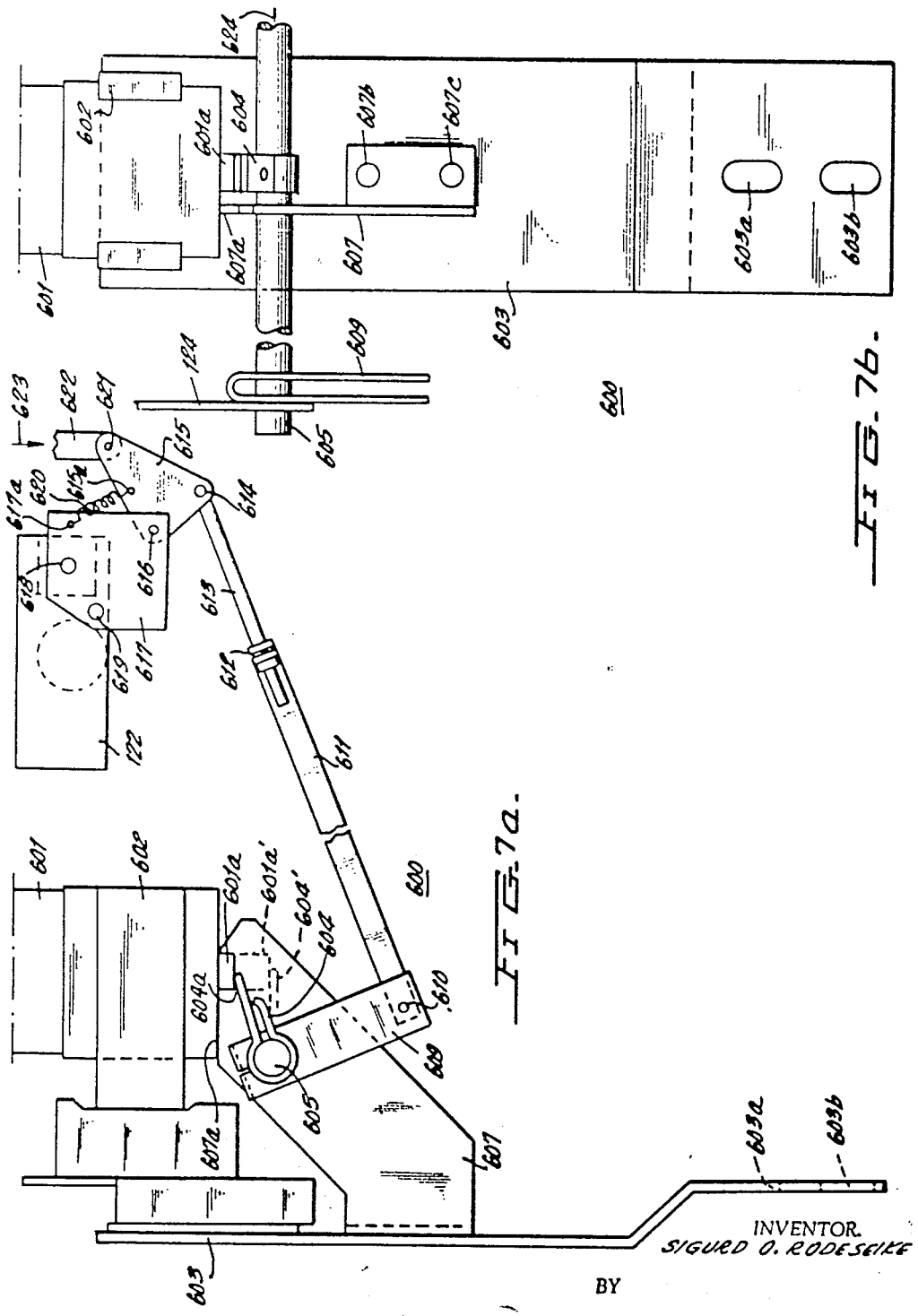

INVENTOR.
SIGURD O. RODESEIKE
BY
OSTROLENK, FABER, GERB & SOFFEN
ATTORNEYS

United States Patent Office
3,235,044
Patented Feb. 15, 1966

1

3,235,044
SPRING OPERATOR MANUAL CHARGING MEANS
Sigurd O. Rodeseike, Greensburg, Pa., assignor to I-T-E Circuit Breaker Company, Philadelphia, Pa., a corporation of Pennsylvania
Filed June 24, 1963, Ser. No. 289,863
9 Claims. (Cl. 192—12)

This invention relates to load interrupter switches for power distribution systems and more particularly to load interrupter switches employing novel spring operator means for controlling the opening and closing of such switches wherein the novel operator means is comprised of a system of unique modular elements which may be arranged in varying combinations to provide as many or as few features as may be desired.

In power distribution systems, protective means in the form of circuit breakers are employed for the purpose of isolating a portion, or portions, of the distribution system from the energy source upon the occurrence of overload or severe fault current conditions. After the tripping of such circuit breakers, in order to further isolate the portion, or portions, of the distribution system, load interrupting switches are employed, which switches are manually operated to the open circuit condition to isolate a portion, or portions, of the distribution network from the energy source during the period in which the fault condition is being corrected and cleared. While such load interrupter switches are designed so as to isolate a portion or portions of the network after tripping of a circuit breaker, it is nevertheless desirable to provide load interrupter switches with the capability of being rapidly operated to both the open and closed position since the possibility may exist that the closing and/or opening operation may be performed accidentally or otherwise during the time in which the circuit connected to the load interrupter switch is energized.

The instant invention provides a spring operator for load interrupter switches wherein a single compressible spring means is provided to swiftly operate the load interrupter switch means to both the open and closed, or connected and disconnected positions.

The basic spring operator device is comprised of a pivotally mounted arm having its free end connected to the compressible spring means and is designed to rotate about a shaft to which it is secured. The arm may be operated by manual means connected to a chain drive which imparts rotation to both shaft and arm by means of a sprocket wheel. The spring means is moved to and beyond an overcenter position in which position it is in the fully charged condition. Upon reaching the overcenter condition, the spring discharges its stored energy to rapidly close or open the load interrupter switch, depending upon the position of the spring means before the charging operation. The spring means, in discharging, drives a second arm secured to a shaft to which one or a plurality of connecting links are ganged. Each such connecting link has its opposite end pivotally linked with an associated load interrupter switch blade member to operate the blade member to either the connected or disconnected position, depending upon the direction of rotation of the shaft operated by the spring operator means.

The spring operator means may also be driven to the compressed position by motor operated means, which may be electrically energized either locally or at some remote location. The motor driven charging means is comprised of a suitable motor means designed to drive its output shaft in only one direction, regardless of the direction through which the spring operator may be charged (be it to open or close the switch). The motor output shaft drives a crank having a pin affixed thereto for operating a

2 charging arm through a reciprocating motion. The charging arm is provided with pawl means designed to rotate a ratchet wheel in such a manner as to advance the ratchet wheel one tooth per reciprocating period of the charging arm. The rotation of the ratchet wheel is imparted through suitable crank means and a connecting link to the spring operator driving arm which drives the spring means towards the fully compressed position. The ratchet wheel is designed to have a missing tooth at one predetermined position thereof so that as soon as the spring reaches the fully compressed position (even though the motor continues to operate), the pawl connecting the reciprocating driving arm to the ratchet wheel is prevented from any further stepping of the ratchet wheel. In order to initiate a subsequent charging operation, solenoid means are provided for stepping the ratchet wheel an amount sufficient to permit the charging pawl to again impart rotation to the ratchet wheel by moving the missing tooth position to a point beyond the charging pawl. Rotation of the ratchet wheel is further imparted to cam means which is designed to deenergize the motor means at the instant the operating spring reaches its fully charged position. The motor is then free to coast to a stop, thus preventing the need for providing any abrupt braking means. As the motor coasts to a stop the driving pawl reaches the missing tooth position so that no further load is imposed upon the motor output shaft.

The link connecting the motor driving means crank to the spring operator driving arm is designed to move in only one direction in charging the spring operator compressible spring means. In order to permit the spring means to be compressed for initiating either a rapid opening or a rapid closing of the load operator switch the connecting link is provided with a pin which forms a lost motion arrangement with an elongated slot in the spring operator drive member. First and second biasing arms pivoted at their upper ends are positioned to be suspended in proximity to the lower end of the connecting link forming the lost motion arrangement. The biasing members are further biased towards one another by a suitable spring means and are adapted to urge the pin of the lost motion arrangement toward a selected one of the extreme ends of the slot in the spring operator driving member under control of the lever pivotally connected to the compressible spring means. When the compressible spring means is compressed and then rapidly expanded as it passes its over-center position, the suspended biasing members reverse their position to relocate the connecting link pin at the opposite end of the elongated slot to automatically position the connecting link in readiness for the next charging operation, be it a closing or opening operation.

In cases where it is desired to move the spring operator to the fully charged position, without, however, immediately performing the rapid opening or closing operation, novel latch means are provided for latching the spring means in the compressed position, which upon release thereof permits the rapid opening or closing operation to be performed. The latch means is comprised of first and second latching members arranged in a scissors-like fashion for latching the spring in both the compressed position in readiness for rapid closing operation and the compressed position in readiness for a rapid opening operation. Each latch member is positioned to bear against a pivotally mounted roller member affixed to the arm controlling the shaft to which all of the load operating switch blades are ganged. The latches may be released either by manual or electrical means so as to disengage the latch member from the pivotally mounted roller member to permit the rapid opening or closing operation. The latch means may be readily mounted to the spring operator without any modification whatsoever and either or both of the latch members may be removed or inserted, depending only upon the needs of the user.

The spring operator may also be charged by manual means operated by a suitable manual operating handle mounted exterior to the cubicle in which the ganged load interrupter switches are housed. The manual operating means is affixed to the door of the cubicle and is coupled to the spring operated crank by a suitable chain drive. The manual charging means is further provided with a rotatable sprocket member which is continuously linked with the chain drive such that any rotation experienced by the spring operator in either opening or closing the load interrupter switches or in charging the spring operator is directly imparted to the sprocket wheel. The sprocket wheel is further provided with a cylindrical portion having an indicator ring affixed about its periphery, which indicator ring is visible through a window in the manual charging means housing, which window is provided with a magnifying glass. The indicating ring is provided with suitable lettering indicative of the state of the spring operator, which lettering is easily readable through the magnifying glass as it appears immediately beneath the window in the manual charging means housing. The indicator ring is further color-coded so as to permit it to be easily read to ascertain the state of the spring operator and hence the load interrupter switches from distances greater than those which would permit reading of the lettering upon the indicator ring.

The manual charging means operating handle is releasably engageable with the sprocket wheel by means of a spring clutch which normally maintains the operating handle out of engagement with the sprocket wheel. By an inward depression of the operating handle against the biasing force of the spring clutch, the handle is then engageable with the sprocket wheel for operating the spring operator to any desired position. If the handle is normally in the spring operator closed position, for example, whereas the spring operator is actually in the open position, the sprocket wheel and operating handle are so keyed as to prevent engagement therebetween. However, the operating handle may be moved into engagement with the sprocket wheel by rotating the operating handle 180° in a free wheeling manner so as to move it to the switch closed position. The operating handle in this position may then be depressed into an engaged position with the sprocket wheel. Once the manual operating handle is depressed and rotated slightly, the end of the handle adjacent the shaft upon which it rotates is engaged by a substantially U-shaped groove provided in the manual charging means housing so that the operating handle remains in the depressed position throughout the rotation of the handle from either open to closed, or closed to open position.

If the manual charging means is employed in a spring operator system using the latch means previously described, and if the operator spring has been charged against its respective latch by either a manual or an electrical operation it is furthermore possible with the free wheeling handle to rotate the handle to the position which the operator spring occupies into the latching mechanism and then to trip the spring operator in the same direction whence it came without performing any switch operation at all. Thus, it is possible to discharge, or unload, a charged spring condition without actually performing either an opening or a closing operation.

The manual charging handle is coupled to a clutch disk, which selectively engages the sprocket wheel assembly by depressing the handle in the manner previously mentioned. The clutch disk has an eccentric periphery, so as to form two shoulders at predetermined positions thereof. This eccentric periphery cooperates with an arcuate projection, provided on the sprocket wheel assembly, which projection is bounded at two angular positions by first and second shoulders. In order to operate the spring operator means, a first shoulder of the clutch disk is brought into engagement with a first shoulder of the sprocket wheel assembly arcuate projection by rotation of the charging handle, the shoulder of the clutch disk is driven into the engaging shoulder of the sprocket wheel assembly so as to rotate the sprocket wheel assembly, in order to charge the spring operator means. Assuming that no latch means are provided in the assembly, the clutch disk under control of the handle means will drive the sprocket assembly so as to fully charge the spring operator means. When the spring operator means passes just beyond the dead-center position, the spring is now free to discharge, and will do so in a very rapid manner. The discharge is so rapid, in fact, that the sprocket wheel assembly will undergo rotation at a rate faster than the operator can hope to move the handle. However, the second shoulder of the sprocket wheel assembly is so position relative to the second shoulder of the clutch disk that it will not move in close proximity to, or come in contact with, the second shoulder of the clutch disk until the springs reach the fully discharged position, so that even though the sprocket wheel assembly may rotate very rapidly under control of the discharging spring means, the operator is in no danger of being struck by a rapidly rotating handle. The same is true if the spring means is charged in the reverse direction, such that when the second shoulder of the clutch disk engages and drives the second shoulder of the sprocket wheel assembly, the first shoulder of the clutch disk does not move in close proximity to the first shoulder of the sprocket wheel assembly until the springs have reached the fully discharged position. Thus, the operator is free to move the manual charging handle without any danger of the handle being overtaken by the spring driving means so as to cause harm to the operator.

The manual charging means is further provided with a novel interlocking system comprising first and second locking means positioned at the upper and lower ends of the housing. Each locking means operates reciprocally mounted plungers for selective engagement with first and second sets of interlocking discs. The interlocking discs are each provided with a substantially rectangular shaped opening, each of which openings are keyed to a substantially rectangular shaped extension of the sprocket wheel. All of said discs are identical and each disc is provided with a plurality of notches about its periphery spaced 90° apart. The notches are dimensioned so as to receive the reciprocally mounted plungers in preselected positions. The discs are mounted in pairs and various combinations of disc mountings are possible so as to permit locking of the manual charging means in the open position, in the closed position, or in both the open and closed positions. The interlock discs being locked in any of these positions prevent rotation of the sprocket wheel due to the manner in which they are keyed thereto, thereby preventing operation of the spring operator and hence the load interrupter switches until the appropriate locking means is operated, disengaging its plunger from the interlocking discs so as to permit rotation of the sprocket wheel and hence the spring operator means.

Each of the aforementioned elements comprising the entire spring operator system are modular in design, thereby permitting their rapid installation into a spring operator system. The modular designs further permit as many or as few of the cooperating subassemblies of the spring operator system to be readily combined in field installations, as well as in the shop. Also, it is further possible to add subassemblies to an already installed system, or to remove a subassembly of an already installed system, if for any reason the needs of the user are changed.

It is therefore, one object of the instant invention to provide novel operator means for controlling the operation of a load interrupter switch to perform both rapid closing and rapid opening functions.

Still another object of the instant invention is to provide novel spring operator means for load interrupter switches and the like wherein the spring operator comprises novel manual charging means designed to charge the spring operator to either the open or closed position and further providing a visual indication of the position of the spring operator.

Still another object of the instant invention is to provide novel spring operator means for load interrupter switches and the like having a novel manual charging means with a free wheeling operating handle releasably engageable from a sprocket wheel employed to charge the spring operator means.

Still another object of the instant invention is to provide novel spring operator means for load interrupter switches and the like wherein the manual charging means is provided with a novel interlock system for locking the manual charging means and hence the spring operator means in either the opened or closed position, or both.

Another object of the instant invention is to provide a novel spring operator means for load interrupter switches and the like comprising manual charging means having condition indicating means for providing a continuous visual indication of the spring operator means position and a free wheeling handle to permit operation of said indicating means under control of motor charging means wherein said handle experiences no rotation when in the free wheeling position.

These and other objects of the instant invention will become apparent when reading the accompanying description and drawings in which:

FIGURES 2a, 2b and 2c are front, side and rear elevational views of the spring operator of FIGURE 1.

FIGURES 2a–a through 2c–c show the sequence of operation for the apparatus of FIGURES 2a–2c.

Figure 1:
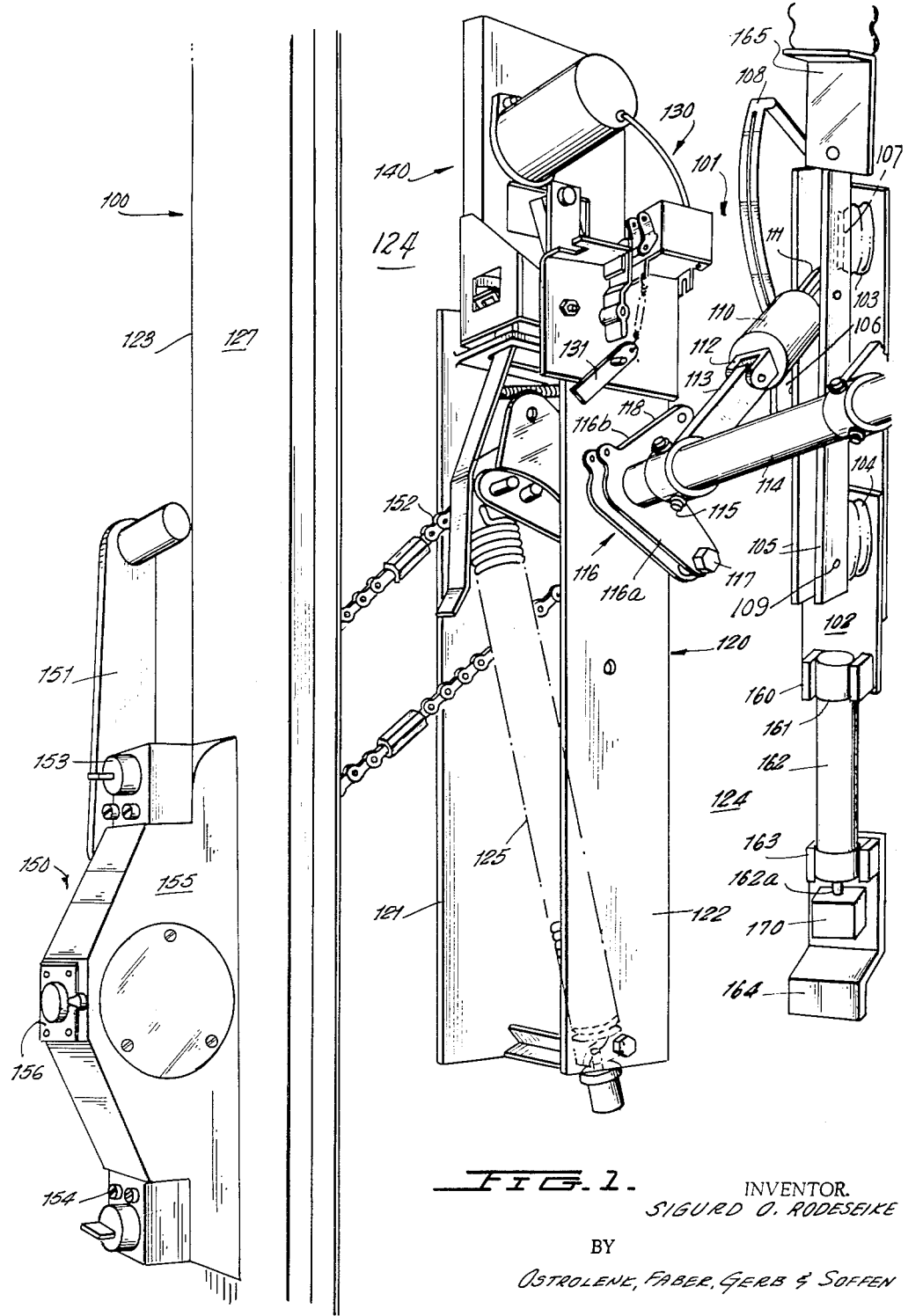
FIGURE 1 is a perspective view of a load interrupter switch under control of a spring operator means designed in accordance with the principles of the instant invention.

FIGURES 3a, 3b and 3c are front, side and rear elevational views of the motor driven charging means employed for charging the spring operator shown in FIGURE 1.

FIGURE 3a–a is a detailed view of the ratchet wheel shown in FIGURE 3a.

FIGURE 3b–b is a detailed view of FIGURE 3b.

FIGURE 4 is an enlarged sectional view of the motor charging means of FIGURE 3b.

FIGURES 5a and 5b are end and side elevational views of the latch means shown in FIGURE 1.

FIGURES 6a, 6b and 6c are side, front and side elevational views of the manual charging means, shown in FIGURE 1.

FIGURE 6d shows a portion of the sprocket wheel taken along the phantom line 6d—6d of FIGURE 6b.

FIGURE 6e is a sectional view of the manual charging means taken along the phantom line 6e—6e of FIGURE 6b.

FIGURE 6f shows a portion of the manual charging means of FIGURE 6e arranged to make the handle assembly permanently manual.

FIGURE 6g is a chart provided to explain the operation of the interlock system.

FIGURES 7a and 7b show the tripping linkage employed to automatically trip the spring operated load interrupter switch of FIGURE 1 under control of the fuse means.

Figure 8A:
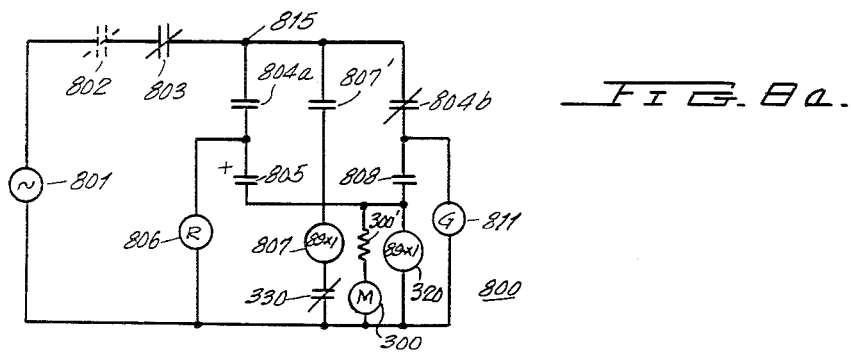
Figure 8B:
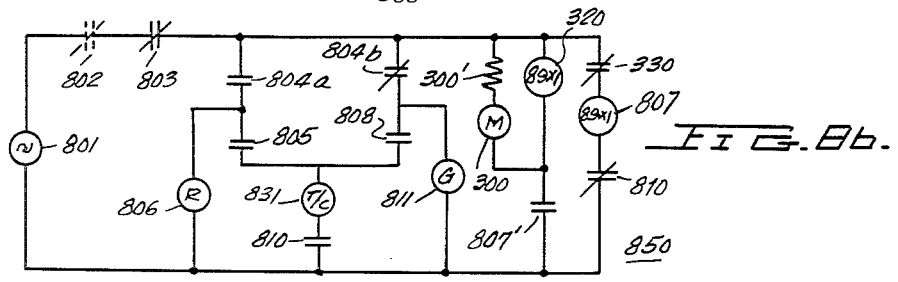
Figure 8C:
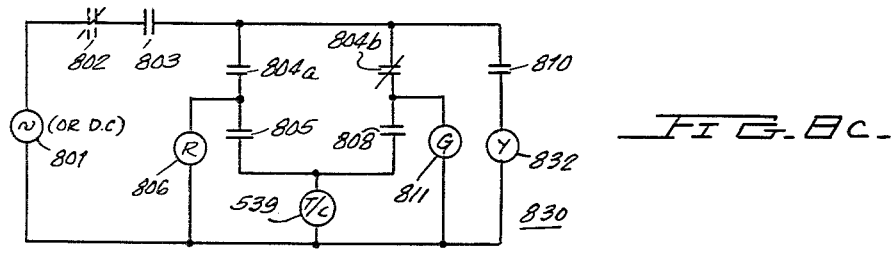

FIGURES 8a, 8b and 8c are schematic diagrams of three different electrical systems employed in the instant invention.

Figure 9A:
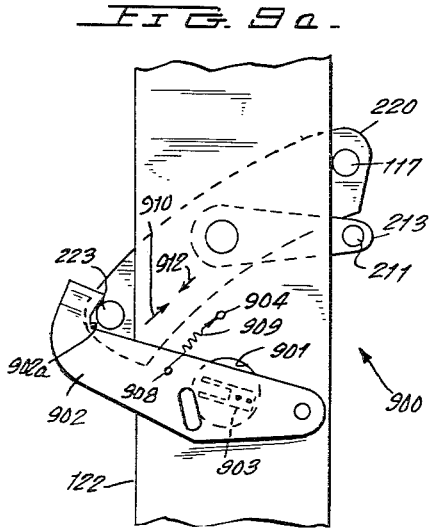

FIGURE 9a is a side view of a portion of the spring operator means of FIGURE 2c.

Figures 9C, 9D:
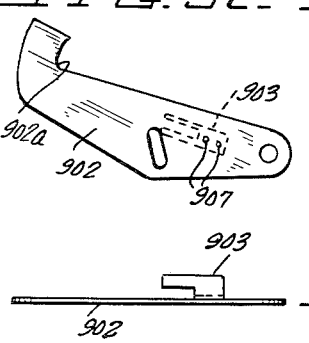
Figure 9B:
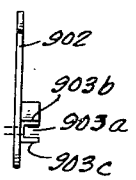

FIGURES 9b–9d are top, side and end views respectively of the holding bracket of FIGURE 9a.

SPRING OPERATOR SYSTEM

Referring now to the drawings, FIGURE 1 shows a ganged load interrupter switch installation 100 controlled by a spring operator means designed in accordance with the principles of the instant invention. The installation 100 is comprised of a plurality of vertically mounted load interrupting switches such as, for example, the switch 101 which is mounted to a vertical support 102 by means of insulator members 103 and 104. Switch 101 is comprised of a pivotally mounted main blade 105 and arcing blade 106, which is designed to come into engagement with the main contact 107 and the arcing contact (not shown) contained within the arc quenching chute 108 respectively. The main blade is pivoted at point 109 under control of insulating connecting arm 110 which is pivotally connected to blade 105 at 111 and further, pivotally connected at its opposite end 112 to rotatable arm 113. Rotatable arm 113 is keyed to shaft 114 by means of threaded members 115 so as to impart any rotational movement experienced by shaft 114 to the lever arm 113. The load interrupter switches described herein may be of any configuration similar to that shown in FIGURE 1 and the design lends no novelty to the system of the instant invention. Typical load interrupter switches which may be utilized in the spring operator means of the instant invention are set forth in copending applications Serial No. 287,309 and Serial No. 286,661, both of which are assigned to the assignee of the instant invention, which describe the configurations and operations of such load interrupter switches in greater detail.

One, or a plurality of such load interrupter switches may be ganged to the operating shaft 114, in a manner similar to that described above. By ganging in this manner, a plurality of such load interrupter switches may be simultaneously operated to the open or closed positions, under control of the spring operator means, in a manner to be more fully described. Typical examples of ganged installations would be a ganging of three such load interrupter switches to a single shaft for protecting a three-phase power distribution system. It should be understood, however, that a greater or lesser number of such load interrupter switches may be ganged to shaft 114.

The shaft 114 is journalled to rotate about its extreme left and right-hand ends (the bearing at the right-hand end not being shown in FIGURE 1) and is operated by the spring operator means which is connected to shaft 114 by the substantially L-shaped operating arm assembly 116 which is keyed to shaft 114 in any suitable manner. Both arms 116a and 116b act as one, both being welded to 114 as shown at 116c and 116d of FIGURE 2b. Fastening means 117 secures assembly 116 to drive 220 while supporting roller 223 therebetween.

The spring operator means 120 is comprised of first and second vertically positioned mounting plates 121 and 122, between which the spring operating means 120 is mounted. The spring operating means rear mounting plate 121 is rigidly bolted to the wall 124 of cubicle 123 which houses the load interrupter switches as well as the spring operating means.

The spring operating means 120 may be charged by motor driven means 140 mounted atop the spring operator means 120 in a manner shown in FIGURE 1, so as to charge the compressible spring 125 in order to rapidly operate the load interrupter switches to both the connected and disconnected positions. The discharge of the compressible spring 125 drives the operating member 116, in a manner to be more fully described, in order to rotate shaft 114 which imparts its rotational movement to the blades, such as, for example, the blade 105 of the load interrupter switches ganged to shaft 114. Shaft 114 may rotate in both the clockwise and counter-clockwise directions to perform both rapid opening and closing operations.

Also mounted atop the spring operator means 120 is the latch means 130 which is provided with latch members, such as, for example, latch member 131 which cooperates with the roller member 118 of the operating member 116, to latch the compressible spring 125 in the spring charged to open and the spring charged to close positions in a manner to be more fully described. The latching means 130 is designed to be operated both manually and electrically by means to be more fully described.

In addition to the motor operated spring charging means 140, spring 125 may be compressed or charged by the manual charging means 150 vertically mounted along the outer wall 127 of cubicle 123. The manual charging means 150 is operated by handle 151 and is coupled to spring operator means 120 by means of chain drive 152, which engages sprocket wheels contained in both manual charging means 150 and spring operator means 120 which sprocket wheels are not shown in FIGURE 1, but will more fully be described hereafter. The manual charging means is further provided with first and second locking means 153 and 154 which are designed to lock the spring operator means and hence the load interrupter switches in both the open and closed positions or any combination thereof by the novel interlock means (not shown) contained within the manual charging means housing 155. Housing 155 is provided with a window 156 beneath which an indicator ring (not shown) is positioned, in order to provide a visual indication of the condition of the spring operating means 120 and hence the load interrupter switches which the spring operator means controls. Although the spring operator means in the installation 100 of FIGURE 1 is shown mounted against the left-hand wall of cubicle 123, the spring operator means is sufficiently versatile so as to be mounted against the right-hand wall of the cubicle, which installation can be performed by a very simple reversal of parts so as to operate the shaft 114 for opening and closing operations of the load interrupter switches in the same manner as previously described. In a like manner, the manual charging means 150 may also be positioned along the right-hand side of front wall 127 of the cubicle 123. It can clearly be seen from the arrangement of FIGURE 1 that the four basic elements of the spring operating means, namely, the spring operator 120, the latch means 130, the motor driven charging means 140, and the manual charging means 150, are all modular type units and may be readily assembled into the system either upon manufacture thereof or right at the field installation where the spring operator means is to be employed. In addition thereto, any of the modular units may be removed or inserted after the initial installation to increase or decrease the number of functions desired by the user, thereby providing an extremely flexible spring operator installation.

BASIC SPRING OPERATOR

FIGURES 2a–2c show the stripped-down basic spring operator unit 120 which is comprised of the first and second supporting plates 121 and 122 wherein left-hand mounting plate 121 is secured to the left-hand wall 124 of the cubicle by fastening means, such as, for example, the fastening means 201. Plates 121 and 122 are secured to one another at their lower ends by spacers 202 and at their upper ends by a plate 203. Plate 203 and spacers 202 may be fastened to the plates 121 and 122 in any suitable manner, such as, for example, by welding. The plates 121 and 122 are provided at their lower ends with suitable apertures for receipt of biasing means 204. The biasing means 204 serves as the pivotal support for a rod 205, which passes through a suitable opening in biasing means 204 so as to enable the rod to move upward and downward as shown by the arrows 207 and 206, respectively. First and second helical springs 208 and 209, respectively, comprise the compressible spring means 125, and are mounted so that the rod 205 is threaded through each of said springs. The lower ends of springs 208 and 209 bear against the upper surface of the biasing means 204, while the upper ends of springs 208 and 209 bear against a washer member 210, positioned at the upper end of rod 205. The upper end of rod 205 is provided with an aperture 211 for pivotal connection, with an opening 212 in lever arm 213. Suitable fastening means 214 pivotally links rod 205 to lever arm 213. As shown in FIGURE 2c, if the lever arm 213 is rotated in the counterclockwise direction, this drives rod 205 downward in the direction shown by arrow 206, causing first and second springs 208 and 209 to be compressed by means of their lower ends which bear against the biasing means 204. As soon as the lever arm pivot pin 214 reaches the dead center condition represented by phantom line 215, springs 208 and 209 will be rapidly expanded thereby releasing their stored energy to perform the next opening (or closing) operation, in the manner to be more fully described. Two springs 208 and 209 have been employed instead of a single spring since the two springs provide ample stored energy, while at the same time occupying less space than a single spring capable of providing equivalent stored energy for operating the load interrupter switches.

The lever arm 213 is mounted for rotation upon shaft 216 which is journalled in bearing 217 provided in side plate 121. Lever arm 213 is further provided with a pin 218 which provides the function of being driven by the motor driven charging member 219, in a manner to be more fully described. When the spring operator means 120 of FIGURES 2a–2c is charged by the motor driving means 140 of FIGURE 1, the charging operation is performed by the motor operated driving member 219, having cammed surfaces 219a and 219b and an elongated slot 221. Elongated slot 221 is coupled to the connecting link (not shown) of the motor driving means and in the position shown in FIGURE 2c operates to drive the driving member 219 in the counterclockwise direction. This causes the cam surface 219a to bear against the pin 218 causing lever arm 213 to be driven in the counterclockwise rotation. When the pin 211 reaches the dead center position, as shown by the phantom pin designated by numeral 211', the pin 211 bears against the cam surface 220a of member 220. As soon as the pin 211' moves beyond the dead center position represented by phantom line 215, the compressed springs 208 and 209 are free to release their stored energy, causing the lever 213 to continue moving counterclockwise from the dead center position shown by pin 211', moving the lever 213 to the phantom line position 213' shown in FIGURE 2c. Since the pin 211 bears against the cam surface 220a of member 220, this causes member 220 to likewise move in the counterclockwise direction. The counterclockwise rotation of member 220 is imparted (through a suitable fastening assembly) to the driving link 116 which is comprised of first and second plates causing the driving link 116 to likewise be rotated in the counterclockwise direction. Member 220 is coupled to driving link 116 by the fastening arrangement 223 which can best be seen in FIGURE 2b. It should be noted that the shaft 114 which can best be seen in FIGURES 2b and 1 is journalled for rotation on shaft 216, which acts as an internal bearing for hollow shaft 114. Shaft 114, however, will rotate only under control of the driving link 116, and not under control of shaft 216. When the lever arm 213 is in the position shown by the dashed line 213', which may be, for example, the position which it occupies when the load interrupter switch is in the fully closed or connected position, the lever arm 213' may be rotated now in the clockwise direction to perform the rapid opening operation. This operation is substantially similar with the motor driven driving member 219 having its cam surface 219b bearing against the pin 218 to drive lever arm 213 clockwise until pin 218 occupies the dead center position 218'. In this position, pin 211′ bears against the cam surface 220b of member 220, which in the position shown by the phantom line 220′ as soon as pin 211′ passes the dead center position, it is rapidly urged in the clockwise direction due to the spring members 208 and 209 releasing their stored energy, thus driving the member 220 in the clockwise direction, which movement is imparted to the driving member 116 due to the coupling between driving member 220 and coupling member 116.

A sprocket 224 is rigidly secured to shaft 217 and may be driven into rotation by the chain drive 152 shown in FIGURE 1 so as to manually charge spring members 208 and 209. Since sprocket 224 is rigidly secured to the same hub as lever arm 213, any rotational movement imparted to sprocket 224 is coupled to lever arm 213 to perform the clockwise and counterclockwise rotation of lever arm 213 in order to effect the performance of both the rapid opening and the rapid closing operations. A further feature of the sprocket 224 is such that being coupled to lever arm 213 through the shaft 217a, when the springs 208 and 209 are charged by the motor driving means, the motion of the lever arm 213 is nevertheless coupled to sprocket 224, which in turn couples this rotation through the chain drive 152 to the manual charging means 150, shown in FIGURE 1, so as to provide a continuous indication through the visible indicator means housed in the manual charging means housing 155 regardless of the fact that the spring operator means may be either manually or electrically operated.

A plurality of resilient washer members 229 are positioned at the lower end of rod 205 and are secured thereto by a pin means 228 threaded through an opening 205a in rod 205. The pin means 228 is further retained within the opening 205a by two cotter pins, such as, for example, the cotter pin 230 shown in FIGURE 2c. The resilient washer members 229 function to cushion the impact of the pin means 228 as it is urged in the direction of fastening means 204 when the lever arm 213 reaches the end of its opening (or closing) stroke and occupies the position substantially as shown in FIGURE 2c.

One simple means for operating the spring operator means 120 is comprised of a handle arm 250 having a suitable aperture 250a at its lower end for rigid securement to a shaft 251. The shaft 251 protrudes through a suitable opening 252 in the cubicle side wall and is journalled for rotation in vertical side plate 121. The extreme right-hand end of shaft 251 is provided with a sprocket wheel 253 which is coupled to spring operator means sprocket wheel 224 by a chain drive which has been omitted herein for purposes of clarity. The upper end of handle arm 250 is provided with a hand grip 254 pivoted to arm 250 by pin 255. By rotating handle arm 250 about its shaft 251 the spring operator means 120 may be operated to perform either the rapid opening or rapid closing operations. This arrangement is provided as an alternative to the manual charging means 150 of FIGURE 1 when the installation requires a side mounted handle arrangement.

In performing the rapid closing operation, it is necessary to provide the total spring force to close in the load interrupter switch blades against their associated stationary contacts when closing against high currents. FIGURE 2a shows an arrangement for catching or restraining spring 208 during the opening operation so as to greatly reduce the tremendous impact caused by both springs 208 and 209 during the discharge thereof. The catching means is comprised of a pivotally mounted member 260 provided with an aperture 261 at its lower end for receipt of the fastening means 204. The member 260 is provided with a pin 262 near its upper end for securing the first end of spring means 263, the opposite end of spring means 263 being secured to stationary pin 262a in housing plate 121. The upper end of compressible spring 208 is provided with a metal collar 264, the upper edge of which bears against washer 210. Collar 264 is provided with a projecting pin 265 which is adapted to mate with a slot 266 provided in member 260.

The operation of the spring restraining member 260 is as follows:

Let it be assumed that the arrangement shown in FIGURE 2a is such that when the lever arm 213 is rotated in the clockwise direction, this rotation will cause a load interrupter switch opening operation. With the position of the spring member means 120 as shown in FIGURE 2a, spring restraining member 260 is biased in the clockwise direction about fastening means 204 due to the biasing force of spring means 263. Member 260, however, is restrained from any clockwise rotation beyond the position shown in FIGURE 2a due to the presence of stop pin 267 which is affixed to vertical side plate 122 of spring operator means 120. As the arm 213 rotates clockwise, pin 265 enters the slot 266 provided in restraining arm 260. At this time, however, spring means 209 is still free to completely discharge its stored energy so as to take complete control of the operation. Thus spring 208 releases its stored energy during only a portion of the opening operation thereby greatly reducing the severe impact accompanying the discharge of the springs 208 and 209. As can be seen in FIGURE 2b, the spring restraining means 260 is actually comprised of first and second members 260a and 260b coupled together by a pin means 268. Thus, when stop pin 267 bears against member 260b, this restrains both members 260a and 260b from any further clockwise rotation beyond the position in FIGURE 2a. It will be noted that there are two pins 265 provided on collar 264 for engaging notches, such as, for example, the notch 266 in members 260a and 260b.

In spring operator assemblies where it is desired to mount the load interrupter switches "upside down" relative to the manner in which they are mounted as shown in FIGURE 1, with the load interrupter switch blade in the opened position, it is possible that the sheer weight of the blades due to the force of gravity may carry these blades down and into engagement with the stationary switch blade contact against the wall of the operator, thereby creating a possible harmful condition. The assembly 900 of FIGURES 9a–9d is thereby provided to overcome this possibility. The assembly 900 is comprised of a substantially L-shaped bracket 902, having a U-shaped member 903 affixed thereto by fastening means 907. The U-shaped member 903 has its base portion 903a engaging the surface of L-shaped bracket 902, and has its extending arms 903b and 903c arranged in L-shaped manner so as to be received by an aperture 901 inside plate 122. The L-shaped bracket 902 has a pin 908 securing one end of a biasing spring 909, the opposite end of which is secured by a pin 904 to sideplate 122. This acts to bias L-shaped bracket 902 in the direction shown by arrow 910. With the load interrupter switches in the opened position, the clipped portion 902a of L-shaped bracket 902 engages the pin 223 of arm 220 (see FIGURE 9a and also FIGURE 2b), thereby preventing any movement of the shaft 114, which is affixed through bracket 116. This prevents the load interrupter switch blades from falling by gravity into engagement with its stationary contacts. During a rapid closing operation, however, pin 211 on lever arm 213 engages the L-shaped arm 903b of U-bracket 903, acting to urge the bracket member 902 downward in the direction shown by arrow 912, so as to move the clipped portion 902a out of engagement with pin 223. This thereby prevents bracket 902a from impeding the rapid closing operation, since pin 211 engages the surface of arm 903b prior to the occurrence of the discharge operation. Thus, by use of the bracket assembly 900, this prevents the open-load interrupter switch blades, designated by numeral 105 in FIGURE 1, from falling into engagement with their associated stationary contacts, in cases where the switch blades are mounted in the "upside-down" direction relative to the mounting shown in FIGURE 1.

MOTOR DRIVEN CHARGING MEANS

The motor driven charging means 140, which can best be seen in FIGURES 3a–3c and FIGURE 4, is comprised of a motor 300 secured to a substantially U-shaped support plate 301 by fastening means 302 and 303. The motor is operated from a local source of energy (not shown) and is provided with an output shaft 304 mounted to rotate a crank 305. The crank is provided with an eccentrically mounted (i.e., offset) pin 306 upon which a roller member 307 which operates as an output crank is rotatably mounted. The roller output crank 307 acts to operate a reciprocating arm 308 which is pivoted at its lower end about a shaft 309. The upper end of reciprocating arm 308 is provided with an elongated notch 310 which slidably engages the output crank 307 to permit the upper end of reciprocating arm 308 to experience reciprocal movement upon rotation of the crank 305 and hence the eccentrically mounted output crank 307. A reciprocating arm 308 is provided with an offset portion 311, which can best be seen in FIGURES 3a and 3b whereby the main body 308 and the offset arm 311 are provided with apertures 312 and 313 for receiving the ends 314a and 314b of a pin inserted through pawl 314. The offset arm 311 is provided with an aperture 315 and the pawl 314 is provided with an aperture 316 for receiving the opposite ends of a torsion spring 317 which is so designed as to bias the pawl 314 to have its front end 314c to bear against a sprocket wheel 318. The sprocket wheel 318 is pivotally mounted upon shaft 309 and is provided with a missing tooth portion 318a for a purpose to be more fully described. An eccentric cam 319 is affixed to the left-hand portion 309a of shaft 309 which has a substantially square cross-section so as to experience any rotation of the shaft 309a imparted thereto by the sprocket 318 which is also rigidly affixed to shaft 309. The eccentric cam 319 is provided with cam surfaces 319a and 319b for the purpose of deenergizing the motor means in a manner to be more fully described, and is further provided with a shoulder 319c which cooperates with a solenoid 320 to initiate the charging operations, in a manner to be more fully described.

Second and third pawls 321 and 322 are affixed to the support member 301 and each are provided with a respective torsion spring 323 and 324 for biasing the front ends 321a and 322a of pawls 321 and 322 into engagement with the teeth of the sprocket wheel 318, for a purpose to be more fully described. Apertures 324 and 321b are provided in the support means 301 and the pawl 321, respectively, for receiving the ends of torsion spring 323, while apertures 325 and 322b are provided in support 301 and pawl 322 respectively to receive the opposite ends of torsion spring 322.

The solenoid member 320 is affixed to the support means flange 301b by fastening means 326, and is provided with an armature 327 which is pivotally connected at 328 to a connecting link 329 which provides the dual function of both initiating operation of the motor driven charging means 140 and of deenergizing the motor 300 in cooperation with a switch means 330, in a manner to be more fully described. The lower end of connecting link 329 is provided with a pin 331 such that the two arms forming the connecting link 329 are positioned on opposite sides of eccentric cam 319 with the pin 331 bearing against the shoulder 319c of eccentric cam 319 for initiation of the motor charging operation, as will be fully described. The connecting link 329 is free to rotate about its pivot point 328 in such a manner as to have its left-hand edge 332 free to bear against the marginal edge 333a of a substantially U-shaped spring member 333 which cooperates with the switch means 330. The switch means 330 is secured to the flange 301b by fastening means 334, and is provided with a depressible button 335 which when in the position as shown in FIGURE 3a places the switch in the closed position. Switch 330 is connected in series relationship with the leads (not shown) connecting the motor 300 to the energy source. Thus, in the position as shown in FIGURE 3a switch 330 being closed permits energization of motor 300. When the connecting link 329 moves clockwise about its pivot point 328, its left-hand edge 332 bears against the marginal edge 333a of spring member 333 causing its portion 333b to bear against button 335 causing it to be depressed. Upon depression thereof, this opens switch 330 thereby breaking the series path between the motor 300 and the energizing source (not shown). The substantially U-shaped support member 301 is affixed at its lower end to the support plates 121 and 122 of the spring operator means 120 by the fastening means 337 and 338 respectively, as can best be seen in FIGURE 3b. The supporting plate 301 is further provided with a pin 339 for mounting a first end of a spring means 340 the opposite end of which is secured to the pin 331 of the connecting links 329 for the purpose of urging the connecting links towards the counterclockwise direction about its pivot point 328. Spring 340 is mounted between pivot pin Y on plate 301 and pivot pin X on link 329 when the mechanism 140 is used in an inverted position in order to overcome the weight of the armature 327 and link 332 due to gravity.

The operation of the motor driven charging means is as follows:

The motor 300 is energized by closure of any suitable switch means (not shown) to rotate the output shaft 304. This causes the output crank 307 mounted upon crank 305 to rotate about shaft 304. The roller member 307, due to its rotational movement imparts reciprocating motion to the reciprocating arm 308. Since pawl 314 is pivotally secured to reciprocating arm 308 and offset arm 311 the front portion thereof 314a bears against sprocket 318. However, in the position shown in FIGURE 3a, pawl 314 is unable to advance sprocket 318 since it is positioned in the region of the missing tooth 318a. In order therefore to begin rotation, the solenoid member 320 is simultaneously energized with the energization of motor means 300 causing the armature member 327 to be urged upward in the direction shown by arrow 341. This causes connecting links 329 to be driven in the direction shown by arrow 341 such that the pin 331 at the lower end of connecting links 329 bears against the shoulder 319c in eccentric cam 319. This causes eccentric cam 319 to undergo a predetermined amount of clockwise rotation about the shaft 309. The clockwise rotation is imparted through shaft 309 to which it is rigidly affixed to the sprocket 318 which is also rigidly affixed to shaft 309. This predetermined amount of clockwise rotation is sufficient to advance the first tooth 318′ to a position to the right of the right-hand edge 314a of pawl 314. As soon as this occurs, pawl 314 is able to advance ratchet 318 one tooth at a time until the missing tooth portion 318a undergoes a complete revolution and is again positioned in a location shown in FIGURE 3a.

The second and third pawl members 321 and 322 are provided so that when the missing tooth position 318a is positioned beneath the front ends 321a and 322a respectively, of either of pawls 321 or 322, the other pawl will hold the ratchet wheel in its appropriate position without it stepping backwards. Thus, as pawl 314 under control of reciprocating arm 308 advances ratchet wheel 318 one tooth at a time, either or both of the pawls 321 and 322 act to lock ratchet wheel 318 in the position to which it was last advanced, while the pawl 314 moves to the left due to the reciprocating action of arm 308 in order to pick up the next tooth. The reactive force on the ratchet wheel 318 is due to the spring members 208 and 209 of FIGURES 2a–2c which are being charged due to the rotation of ratchet wheel 318 and which are connected thereto by suitable linkages, which is to be more fully described.

As the ratchet wheel 318 continues its rotation, the cam surface 319a of eccentric cam 319 moves to a position on the opposite side of shaft 309. That is, it undergoes a 180° rotation. This cam surface 319a bears against the pin 331 causing the connecting links 329 to be rotated in the clockwise direction about their pivot point 328 to cause the left-hand edges 332 thereof to bear against the marginal edge 333a of spring member 333. As soon as the location 319a bears against the pin 331 the spring member 333 acts to fully depress button 335 causing the current path connecting the motor 300 to the energy source to be cut off. At this time, even though the motor is not energized, no braking means are provided and the motor 300 is permitted to coast to a stop. The ratchet wheel 318 may still be under control of the motor means and will continue advancing until the missing tooth position 318a is again positioned in a location as shown in FIGURE 3a. The motor means is designed to coast to a stop and normally requires approximately the time which it takes to undergo a one-half revolution rotation of ratchet wheel 318. If the motor has not yet coasted to a stop and still continues to cause arm 308 to reciprocate none of this reciprocating movement will advance ratchet wheel 318 due to the positioning of the missing tooth region 318a beneath the pawl 314. As soon as this position is achieved, the biasing spring 340 acts to rotate connecting links 329 counterclockwise about the pivot point 328 causing the pin 331 to again be positioned beneath the shoulder 319c provided in eccentric cam 319. This places the motor operated charging means in a position for the next charging operation and releases the depressible button 335 to again establish a closed current path between the motor 300 and the energy source (not shown).

The shaft 309 has mounted thereto a crank arm 341 which is rigidly affixed to the shaft and which is provided with a pin 342 at its upper end. A driving link 343 is provided with a suitable aperture 343a for receiving pin 342 so as to pivotally connect crank 341 to driving link 343. The lower end of connecting link 343 is provided with a suitable aperture 343b for receiving a pin 344 which is threaded therethrough and which is further threaded through the elongated slot 221 provided in drive member 219 which can best be seen in FIGURES 3c and 2c respectively. The rotation of the ratchet wheel 318 is imparted to shaft 309 which causes crank 341 to rotate therewith, driving the connecting link 343 downward in the direction shown by arrow 345 so as to impart rotational motion to the driving member 219, in the manner as previously described with reference to FIGURES 2a–2c. Let it first be assumed that the connecting link 343 causes the driving link 219 to be rotated counterclockwise so that it assumes the position shown by the dotted configuration 219'. As previously described, this complete action takes place through only one-half revolution of the ratchet wheel 318. Thus, the remaining 180° rotation of ratchet wheel 318 is undergone under a no-load condition since the connection link 343 is simply driven in the upper direction, as shown by arrow 346 to return the driving member 219 to the position substantially as shown in FIGURE 3c. Thus, the coasting operation of the motor 300 is done under a no-load condition and the ratchet wheel 318 is thereby easily stepped through the remaining 180° rotation to return the missing tooth portion 318a to the position as shown in FIGURE 3a.

Since the connecting link 343 undergoes substantially only reciprocal action in moving first downward in the direction shown by arrow 345 and upward in the direction shown by arrow 346, biasing means 347 and 348 are provided for approprately positioning the pin 344 at the correct end of elongated slot 221 in drive member 219. The biasing means 347 and 348 are substantially flat irregularly shaped members, as can best be seen in FIGURE 3c and are provided with flanges 347a and 348a respectively, at their upper ends, which flanges are inserted through suitable slots provided in the supporting member 301. Each of the members 347 and 348 are further provided with cotter pins 349 and 350 so as to retain the flanges 347a and 348a within the suitable slots of support member 301. The members 347 and 348 are permitted to then hang substantially freely suspended from the support member 301 and are further biased toward one another by the spring member 351 which is secured to members 347 and 348 by means of cotter pins 352 and 353 respectively, which are threaded through apertures provided in members 347 and 348 so as to secure the opposite ends of spring member 351, in the manner shown in FIGURE 3c. Each of the members 347 and 348 are further provided with cam surfaces 347c and 348c respectively, which extend substantially towards one another, as can best be seen in FIGURE 3c, for the purpose of suitably positioning the lower end of connecting link 343. In operation, the lever arm 213 is capable of assuming either of the positions 213 or 213', as shown in FIGURE 2c. Considering FIGURE 3c, the operating arm 213 is in such a position that the roller member 213a pivotally connected thereto bears against member 347 at 347d. Thus, instead of hanging substantially downward, member 347 is urged a predetermined amount in the direction shown by arrow 354. Member 348 is drawn in substantially the same direction due to its connection with member 347 through spring member 351. This causes the cam surface 348c to bear against pin 344 thereby urging the pin to take up a position at substantially the extreme left-hand end of the elongated slot 221. This places the pin 344 substantially to the left of the dead center position shown by phantom line 355. Thus, at the initiation of the next motor charging operation, the connecting link 343 will cause the driving member 219 to be rotated counterclockwise about its shaft 216 to rotate or drive the lever arm 213 counterclockwise which is as it should be. As soon as the lever arm 213 passes the dead center condition it will immediately permit discharge of the compressed springs 208 and 209 causing the lever arm 213 to move to the position 213' as shown in FIGURE 2c. In this position, the roller member 213 will bear against member 348 at position 348d causing the member 348 to be driven a predetermined distance to the right, as shown by arrow 356. Member 347 will also be urged in the direction shown by arrow 356 due to its connection with member 348 through spring means 351. This, in turn, will cause cam surface 347c to bear against pin 344 urging it to the extreme right-hand end of elongated slot 221. Thus, at the beginning of the next motor charging operation, connecting link 343 will rotate the drive member 219 clockwise about its shaft 217a which again is as it should be. Thus, it can be seen that regardless of th fact that the motor 300 has its output shaft driven in only one direction at all times and regardless of the fact that the ratchet wheel 318 rotates in the same direction at all times, the correct rotation is imparted to the drive member 219 by the positioning means 347 and 348 so that the driving means 219 is never driven in the improper direction. Since the spring operator means may be mounted to either the left-hand or right-hand wall of the cubicle, the clockwise rotation of drive member 219 shown in FIGURE 3c may be employed to initiate either the closing or opening operation and likewise the counterclockwise rotation of drive member 219 may be employed to initiate either the spring closing or spring opening operations, depending only upon the needs of the user.

When the motor charging means is used without latches, the solenoid 320 is wired so that as long as the contact means (not shown) that starts the charging sequence is maintained, the solenoid 320 remains energized, holding pin 331 in the uppermost position, so as to keep the contact (not shown) of switch 330 open to prevent a pumping action.

LATCH MEANS

FIGURES 5a and 5b show the latch means 130 which can also be seen in FIGURE 1, which latch means is employed to latch the spring operator device in the spring charged to open and/or the spring charged to close positions. The latch means is mounted to the front vertical supporting plate 122 of the spring operator means which rigidly secures an L-bracket 501 of the latch means 130 to plate 122 by the fastening means 502 and 503. The L-bracket has a cylindrical shaped post 504 secured near its lower end, which post forms a narrower cylindrical portion 504a projecting outwardly from bracket 501. The cylindrical portion 504a is adapted to extend through suitable openings 506a and 507a in latch members 506 and 507 respectively. The latch members 506 and 507 are mounted upon cylindrical portion 504a in the following manner:

A first washer member 508 is positioned on cylindrical portion 504a so that its rests against shoulder 504b of post 504. The latch member 506 is then positioned on the post. Second and third washers 509 and 510 are then positioned on portion 504a. The latch member 507 is then positioned on cylindrical portion 504a adjacent washer member 510 and a fourth washer 511 is positioned on cylindrical portion 504a atop latch member 507. A suitable fastening member 512 is then positioned on cylindrical portion 504a atop latch member 507 to secure the entire assembly upon post 504. Latch members 506 and 507 are provided with pins 513 and 514 respectively, which extend through suitable apertures in the fastening means in the direction towards vertical plate 122, as can best be seen in FIGURE 5a. Pins 513 and 514 are adapted to receive the opposite ends of a spring member 515 in a manner shown in FIGURE 5b, which spring member acts to bias latch member 507 counterclockwise about post 504 and acts to bias latch member 506 clockwise about post 504. Therefore, in the normal position, latch members 506 and 507 occupy the positions as shown in FIGURE 5b. L-bracket 501 is provided with a second post 516 affixed thereto which also tapers to a narrower cylindrical portion 516a. Mounted on portion 516a is a latch release member 517 provided with an aperture 517a for receiving post portion 516a. Suitable fastening member 518 is provided for the purpose of securing latch release member 517 to post 516. The latch release member 517 is provided with two suitable apertures provided for receiving threaded bolts 519 and 520. Each bolt is provided with a bolt head 519a and 520a respectively which are positioned so as to abut against the inside edges of latch members 506 and 507 respectively as shown in FIGURE 5b. In order to retain the bolt members 519 and 520 after adjustment thereof nuts 521 and 522 respectively are provided to threadedly engage bolts 519 and 520 and to bear against the latch release member 517 to maintain bolts 519 and 520 in the adjusted positions.

The latch means 130 is provided with manual operating means 523 which is comprised of a flexible cable 524 having a substantially flexible wire 525 running through the center of a flexible cable. A first end of the flexible wire 525 (not shown) extends through a suitable opening in the cubical wall 123 which is provided with fastening means 825 for securing the flexible cable 524 thereto. The flexible wire 525 is affixed to a knob 526 in any suitable manner. The opposite end of flexible wire 525 is affixed to first and second stop members 527 and 528, stop member 528 being affixed to the end of the flexible wire 525. The L-bracket 501 is provided with a plurality of flanges 501a–501d for positioning and supporting flexible cable 524 and flexible wire 525. Flange 501a is provided with a suitable aperture for supporting flexible cable 524 while flanges 501b and 501c support the flexible wire 525. Flange 501d acts as a stop means against which stop member 528 abuts. A spring member 529 is provided on flexible wire 525 so that a first end thereof abuts against stop member 528 and a second member thereof abuts against flange 501c. With the arrangement shown in FIGURE 5b biasing spring 529 acts to urge stop member 528 in the direction shown by arrow 530. This maintains the latch means 130 in the normal unoperated position as shown in FIGURE 5b. The release operation for latch members 506 and 507 is as follows:

As previously described, the connecting crank assembly 116 is rigidly affixed to shaft 114 to which the load interrupter switches are ganged. The connecting crank is comprised of first and second members each having suitable apertures 116c and 116d for receiving a pin 116e. Mounted on pin 116e and between the members 116 is a roller member 116f. Pin 116e is rigidly secured into place by the fastening members 116g and 116h. Let it be assumed that a charging operation has been initiated in order to charge the spring operator means to rapidly open the load interrupter switches. During this charging operation the spring operator means acts to rotate the connecting crank 116 counterclockwise in the direction shown by arrow 531. The connecting crank 116 continues such counterclockwise rotation until the roller member 116f bears against the lower edge of latch member 506 as shown in FIGURE 5b. In this position the compressible spring of the spring operator has been fully charged and has slightly passed the dead center position as previously described so that it is now ready to release its stored energy in order to initiate the opening operation. However, in the presence of the latch member 506 the compressible spring is unable to release its stored energy due to the fact that roller member 116f abuts against the latch member 506. In order now to perform the rapid opening operation, the knob 526 is grasped and pulled in the direction by arrow 532. This causes the opposite end of the flexible wire 525 to move in the direction shown by arrow 533 causing stop member 528 to be urged against the spring means 529 and causing stop member 527 to be urged against the latch releasing member 517. As the stop member 527 is drawn against a latch release member 517, this causes latch release member 517 to be urged counterclockwise in a direction shown by arrow 534 about its pivot 517a. This rotation drives the heads of bolts 519 and 520 against the inner edges of latch members 506 and 507, causing latch member 507 to rotate clockwise and causing latch member 506 to rotate counterclockwise. The rotation of latch member 506 counterclockwise causes its lower end to move in the direction shown by arrow 834 such that its lower edge which rollingly engages roller member 116f rolls out of engagement with roller 116f so that the roller member 116f may pass beneath latch member 506. Due to the fact that the compressible springs are fully charged at this time, this permits the connecting crank 116 to rapidly move in the counterclockwise direction, as shown by arrow 531 in order to rapidly rotate shaft 114. The rotation of shaft 114 causes a rapid opening operation upon all of the load interrupter switches which are ganged to shaft 114. At the end of the opening operation, the roller member 116f rotates to a position well beyond the lower edge of latch member 507. The spring operator means is now available to perform a rapid closing operation upon the load interrupter switches. The rapid closing operation is performed as follows:

In order to perform such a rapid closing operation, the connecting crank 116, in its new position, must be rotated in the clockwise direction, as shown by arrow 535 until its roller member 116f shown in the dotted position 116f′ bears against the lower edge of latch member 507. In this position, the compressible springs pass the dead center position and are fully available to perform a rapid closing operation. However, this is prevented by roller member 116f' which abuts against latch member 507. In order to perform the rapid closing operation, the knob 526 is grasped and pulled in the direction shown by arrow 532. This causes stop means 527 to be pulled against latch release member 517, driving the bolts 519 and 520 against the latch members 506 and 507 respectively, rotating them respectively, in the counterclockwise and clockwise directions. The rotation of latch member 507 in the clockwise direction causes its lower end, which is rollingly engaging roller member 116f' to roll out of engagement with roller 116f' so that the roller member may freely pass beneath the latch member 507. At this instant of time the connecting crank 116 is then available to rotate rapidly in the clockwise direction, as shown by arrow 535, to rotate shaft 114, in order to rapidly move the load interrupter switches ganged to shaft 114 to the closed, or connected, position.

In order to electrically operate the latch means 130, a solenoid means 539 is provided which is rigidly secured to L-bracket 501 in any suitable manner. The solenoid 539 is connected to a suitable source of electrical energy (not shown) in order to operate its armature 540. The armature 540 is pivotally connected to a connecting link 541 by a pin means 542. The opposite end of connecting link 541 is connected to a short push rod 543 by a pin member 544. A bracket 545 is affixed to the solenoid 539 and is provided with a suitable slot (not shown) for receiving connecting links 541. Bracket 545 acts as a fulcrum for connecting link 541 in a manner to be more fully described. The push rod 543 is provided with a flat head 543a which is positioned adjacent the upper end of latch release member 517.

Electrical operation of the latch means 130 is as follows:

The solenoid 539 is provided with bias means (not shown) so that when deenergized the solenoid 539 occupies the position as shown in FIGURE 5b. Upon energization thereof, armature 540 is drawn inward in the direction shown by arrow 546. This pulls the upper end of connecting link 541 in the same direction. The bracket 545, which acts as a fulcrum, causes connecting link 541 to pivot about the fulcrum 545, driving the lower end of connecting link 541 in the direction shown by arrow 534. This motion is imparted to the push rod 543a which bears against latch release member 517 to urge it in the counterclockwise direction. The counterclockwise motion of latch release member 517 acts to drive the latch members 506 and 507 in the counterclockwise and clockwise directions, respectively, in the same manner as previously described, so as to release the connecting crank 116 in the same manner as previously described, in order to permit the compressible spring of the spring operator means to release its stored energy. The latch members 506 and 507 are returned to their normal positions (the positions shown in FIGURE 5b), by means of the spring biasing member 515 affixed to latch members 506 and 507 by the pins 513 and 514, respectively, so as to urge these latch members in the clockwise and counterclockwise directions, respectively.

As can clearly be seen, the latch means 130 may be very readily assembled upon the spring operator means vertical plate 122 so as to provide the spring operator means with a latching mechanism having the capability of latching the spring operator in the spring charge to open and/or the spring charge to closed positions, respectively. If it is desired to have only one such capability, either one of the latch members 506 and 507 may be removed without effecting in any way the operation of the latch mechanism 130. Thus, for example, if an installation of load interrupter switches is provided with the spring operator means having a latch mechanism 130 with only one of the latch members 506, it becomes a very simple task to add the latch member 507 to provide the installation with the further capability of providing latching capabilities for both the spring charge to open and the spring charge to close operations. Likewise, the latch mechanism 130 may be provided with either the manual or electrical latch releasing means, or both, depending only upon the needs of the user and either of these latch mechanism actuating means may be added at any later date to provide an installation with further capabilities.

MANUAL CHARGING MEANS

In addition to the motor operated charging means for charging the spring operator of FIGURE 1, manual operator charging means 150, as can best be seen in FIGURE 1, may be added to the spring operator to provide for manual charging of the spring operator 120 for both rapid opening and rapid closing operations. The manual charging means 150 is linked to the spring operator 120 by a chain 152. The chain 152 drives a sprocket 224, as previously described (FIGURE 2A), which is rigidly secured to the lever arm 213, so that any motion imparted to or caused by the compressible spring members is directly and continuously imparted to the sprocket 224. This motion is also imparted to a suitable sprocket (not shown) in the manual charging means 150 so as to provide a continuous visual indication of the spring operator position at any given instant. The manual charging means 150 can best be seen in FIGURES 6a–6f, and is comprised of a housing 155 suitably secured to the cubicle wall 127 in any well known manner. The housing 155 is journalled along its opposite sides 155a and 155b to receive a shaft 401. Shaft 401 has a substantially square cross-section along the entire length of its portion 401a (note FIGURE 6e), while the remainder of its length 401b has a substantially circular cross-section. The very end of the portion 401a receives a handle arm 151 which is provided with a substantially square opening 151a to receive portion 401a of shaft 401. Thus, any rotation of handle arm 151 is imparted to shaft 401. The upper end of handle arm 151 is provided with a hand grip portion 151b pivotally linked to the handle arm 151 by a suitable pin 151c. A spring clip 402 is staked to the housing 155 at 403 and is provided with an inwardly projecting portion 404 which abuts against the right-hand edge of handle arm 151 to hold it in the position as shown in FIGURES 6a and 6b.

The shaft 401 has its circular cross-sectional portion journalled in a shaft bearing member 406, such that any rotation of either shaft 401 or shaft bearing 406 is not imparted to the other. Also mounted for rotation on shaft 401 is a sprocket wheel assembly 407 having a neck portion 408 which fits beneath the shaft bearing 406 in the manner shown in FIGURE 6e. The sprocket wheel 407 is provided with a sprocket 409 having suitable teeth for making engagement with the chain drive 152, as can best be seen in FIGURE 1. The sprocket wheel 407 is further provided at its opposite end with a first substantially deep cavity 411 for positioning and supporting a spring member 412 which acts as a spring clutch, in a manner to be more fully described. The cavity 411 widens to form a substantially larger cavity portion 410 for receiving the clutch member 413, in a manner to be more fully described. The clutch member 413 is keyed to the square cross-sectional portion 401a of shaft 401 so that any rotation imparted to shaft 401 is likewise imparted to clutch 413. A second shaft bearing 414 is keyed to receive the square cross-sectional portion 401a of shaft 401 and is adapted to be free to rotate within the housing portion 15a in which it is journalled. The second shaft bearing means 414 is affixed at its left-hand end to the handle arm 151 and has its right-hand end bearing against the clutch member 413.

The face of the clutch member 413 can best be seen in FIGURE 6d and is provided with a first circular periphery portion 413a and a second circular periphery portion 413b which is located at a greater radial distance from the center of rotation 413c for clutch 413 than is the circular portion 413a. The two circular portions join at shoulder portions 413d and 413e. The sprocket member 407 is provided with a circular portion 407a which ends abruptly to form the shoulders 407b and 407c. The shoulders 407b and 407c of sprocket wheel 407 cooperate with the shoulders 413d and 413e of clutch 413, in a manner to be more fully described.

As can best be seen in FIGURE 6e, the sprocket wheel assembly 407 is journalled to freely rotate about the circular cross-sectional portion 401b of shaft 401. Thus, any rotation of the spring operator means which is imparted to the chain drive through the spring operator sprocket wheel is in turn imparted to the sprocket wheel 407. The sprocket wheel 407 is free to rotate about shaft 401 and does not impart any rotational movement nor does it receive any rotational drive from the clutch member 413 when the clutch is in the position as shown in FIGURE 6e. The sprocket wheel assembly 407 is further provided with an indicator ring 407e which is secured to the sprocket assembly 407 by fastening means 407f. The indicator ring 407e is so positioned as to lie immediately beneath an opening or window 156 provided at the front of the housing 155. A magnifying glass 156a is positioned and rigidly maintained within the window 156. The indicator ring 407e is color coated so that specified sections thereof are colored red, green, aluminum and yellow. When the red section is positioned beneath window 156 this indicates that the load interrupter switches are in the closed position. When the green section is positioned beneath the window, this indicates that the load interrupter switches are in the fully opened, or disconnected positions. The aluminum section is employed to represent the fact that the compressible springs are discharged, while the yellow section of the indicator ring is employed to identify the fact that the compressible spring members of the spring operator are in the charged condition. Thus, an operator standing at distances from ten to twelve feet from the housing window 156 may readily determine the state of the spring operator and also the load interrupter switches, simply by observing which color of the color-coated indicator ring lies beneath the window 156. As has been previously described, any rotational movement of the spring operator device is imparted to the sprocket wheel 407 of the manual charging means 150 by means of the chain 152 which can be seen in FIGURE 1. In addition to being color-coated, the indicator ring 407e also has suitable lettering on the outer surface of the ring, such as, for example, the lettering 416 shown in FIGURE 6b, which, when positioned beneath window 156 indicates that the switch is in the closed condition by the words "SW. Closed." The other states or positions of the spring operator means are similarly printed on the indicator ring so that both color-coating and word indications of the condition of the spring operator means are observable through the housing window 156. The magnifying glass 156a serves to facilitate the observance of the spring operator means and switch state.

The operation of the manual charging means under control of the operating handle arm 151 is as follows:

Let it be assumed that the operating handle arm 151 is in the position as shown in FIGURES 6a, 6b and 6d, this position being with the handle up and the load interrupter switches in the closed condition. In order to operate the handle arm 151, the spring clip 402 is pressed outwardly in the direction shown by arrow 420 of FIGURE 6e so as to release the handle arm. The arm may then be rotated in the clockwise direction (or downwardly) as shown by arrow 421 of FIGURE 6a. However, it should be noted that the clockwise rotation of handle arm 151 will not impart rotation to any other member of the handle assembly even though it is keyed to the square cross-sectional portion 401a of shaft 401 as the sprocket wheel assembly 407 and the shaft bearing 406 are not keyed to the circular cross-sectional portion 401b of shaft 401. Thus the handle is free wheeling and simply the rotation thereof will in no way impart any rotational movement to any other element of the manual charging assembly 150.

After releasing the handle arm 151 from the spring clip 402, and in order to perform the manual charging operation, the handle is pressed in, in the direction shown by arrow 422 of FIGURE 6e, causing handle arm 151, shaft bearing 414 and clutch 413 to likewise be driven in the direction shown by arrow 422. This causes the clutch spring 412 to be depressed, allowing clutch 413 to enter into the cavity 410 of sprocket wheel assembly 407. As soon as the right-hand face of clutch 413 (see FIGURE 6e) bears against the left-hand face of the sprocket wheel assembly 407, the handle arm 151 is then slightly rotated in an amount sufficient to cause the lower portion 151a of handle arm 151 to be received by a U-shaped slot 419 in the housing 155. The handle arm then may be released. The clutch spring 412 will then cause the handle arm to be urged in the direction shown by arrow 424, but movement in this direction is limited due to the fact that the portion 151a of handle arm 151 is captured by the U-shaped notch 419. The handle arm is then rotated in the clockwise direction, as shown by arrow 421 (which is the counterclockwise direction as shown in FIGURE 6c) until the shoulder 413d of clutch 413 bears against the shoulder 407c of sprocket wheel assembly 407. As these two shoulders 407c and 413d engage, any further rotational movement of clutch 413 in the direction shown by arrow 418 is imparted to the sprocket wheel assembly 407. This rotational movement, which is also experienced by sprocket 409, is imparted to the sprocket 224 of the spring operator means 120 through chain drive 152, thus causing the manual charging operation of the compressible spring means 125 (see FIGURE 1). The charging operation will continue until the compressible springs reach a point slightly beyond the dead center position, at which time the springs will either cause a rapid opening operation, or will be set in the "spring charged to open" position due to engagement of the connecting crank member 116 with the appropriate latch member of the latch means 130. It should be noted that as the sprocket wheel assembly 407 continues to rotate, so does its indicator ring 407e, thus changing both the color coating and the word designating the spring operator position beneath the window 156. As soon as the handle arm 151 is rotated to a position 180° away from the position shown in FIGURE 6a, the lower portion 151 thereof is freed from the U-shaped notch 419, causing the clutch spring 412 to drive shaft bearing 414, clutch 413 and handle arm 151 in the direction shown by arrow 424 of FIGURE 6e, so as to release clutch member 413 from engagement with the sprocket wheel assembly 407. At this time, the spring operator means is in the "spring charged to open" position and may rotate rapidly to provide an opening operation, in the manner previously described. Since the rapid closing operation imparts rotation to sprocket wheel 407, this again positions the appropriate colored section of the color-coated indicator ring 407e beneath window 156. Also, even though the sprocket wheel assembly 407 may rotate very rapidly, shoulder 407b does not engage shoulder 413e, but comes to rest without engagement thereof, so as to prevent any harm to befall the operator who may have rotated handle arm 151 to charge the spring operator means 120.

Another use for the manual charging means permits the discharging of the spring operator means while it is in the fully charged position (either "spring charged to open" or "spring charged to close") without performing an opening or closing operation. If motor operation is involved in addition to the manual charging means, it is possible that the motor may bring the switch position out of phase with the handle position. If manual operation then is required, the handle arm 151 must first be brought into phase with the spring operator means position in order to enable engagement between the appropriate shoulders 413d or 413e of clutch 413 with the shoulders 407b or 407c of the sprocket wheel assembly 407. This operation is done by free wheeling the handle arm 151 180° from either of the fully up or fully down positions so as to permit the handle arm to drive the appropriate shoulder of the clutch member 413 against the appropriate associated shoulder of the sprocket wheel assembly 407. Unless and until the handle arm 151 is so rotated, the clutch 413 will prevent the handle arm 151 from being depressed in the manner as previously described, due to the fact that the arcuate portion 413b of clutch member 413 will bear against the arcuate portion 407a of the sprocket wheel assembly 407 and will not be fitted in in the manner shown in FIGURE 6d until the handle arm 151 is so appropriately positioned.

When the latch means 130 is integrated into the spring operated assembly so the spring is charged against its respective latch, either through the manual or electrical charging means, the clutch may be brought into position with the sprocket wheel assembly 407 by free wheeling the handle arm 151 in the manner previously described in order to trip the charge spring in the direction from which it was charged without performing any switch opening or closing operations whatsoever. This is done simply by rotating handle arm 151 in the direction opposite that to the direction in which the spring is charged (either to open or to close) so as to release the stored energy in the direction in which the load interrupter switches are already positioned. Thus, spring discharge may occur without performing either an opening or a closing operation.

In addition to the above capabilities, the manual charging means 150 is provided with a novel interlock arrangement comprised of first, second, third and fourth disc members 450A–450D, which can best be seen in FIGURES 6b, 6c and 6e. Each of the discs 450A–450D are substantially identical and each, such as, for example, the disc 450A of FIGURE 6c is suitably keyed to sprocket wheel 407 so as to be rotatable therewith. The disc 450A is provided with three notches 450A–1—450A–3, which notches are spaced at 90° intervals from one another. The discs 450A–450D are arranged in pairs, such that discs 450A and 450B form one pair while discs 450C and 450D form the second pair. In assembling the discs within the housing 155, disc A is positioned so as to bear against shaft bearing 406. Disc 450B is positioned adjacent disc 450A, as shown in FIGURE 6e. A spacer member 451 is then positioned adjacent disc 450B. Disc 450C is positioned to bear against spacer 451, while disc 450D is positioned adjacent 450C. A second spacer member 452 is provided to suitably position the discs a spaced distance from the sprocket 409 against the face of which the spacer member 452 rests. It can be seen from the chart shown in FIGURE 6g that the two disc pairs can be so arranged with the disc members rotated relative to one another so that all three of the notches in each disc come into alignment, or so that only two of the three notches come into alignment with one another as between the two discs of each disc pair.

These notches and the manner in which they are positioned cooperate with the lock means 430 and 433, which can best be seen in FIGURE 6c to provide the interlocking features, as will be more fully described. The lock members 430 and 433, which have been shown only in FIGURE 6c, and not in FIGURES 6a and 6b, for purposes of clarity, are rigidly affixed to the housing 155 and are each provided with suitable tumbler assemblies 431 and 434 respectively, for the receipt of keys 432 and 435 respectively. Each of these tumblers, when operated by the keys, control the vertical movement of plungers 436 and 437 respectively, associated with the locks 430 and 433. Through the use of these locks, together with the disc members 450A–450D, the load interrupter instal-lation may be locked in a variety of predetermined positions, depending upon the manner in which the discs of each disc pair are arranged relative to one another.

Considering the chart of FIGURE 6g, the chart shows therein the variety of positions in which the discs may be placed to obtain a variety of interlock positions. With the handle arm 151 in the up position, as shown in FIGURES 6a and 6b, and with the load interrupter switches being closed in this position, the first row of the chart of FIGURE 6g shows the discs 450A and 450B as they are oriented looking in to the housing assembly from the right-hand side thereof (considering FIGURE 6e for example). In this position, it can be seen that the notch 1 of disc 450B is in alignment with the notch 2 of disc 450A, while the notch 2 of disc 450B is in alignment with the notch 3 of disc 450A. It should be noted that notch 3 of disc 450B and notch 1 of disc 450A are not in alignment. As can be seen in FIGURE 6b, plunger 437 cooperates with disc pair 450C and 450D, while plunger 436 cooperates with disc pair 450A and 450B. Returning again to the disc positions for discs 450A and 450B in the first row of the chart of FIGURE 6g, it is not possible to lock the manual charging means 150 in the switch closed position since the plunger will fail to enter the notch 1 of disc 450A since no notch from disc 450B lines up with it. However, if the disc pair is rotated 180° in the direction shown by the arrows in the chart of FIGURE 6g, it can be seen that the notch 3 of disc 450A and the notch 2 of disc 450B are in perfect alignment and will permit the entrance of plunger 436 into the notch portion thereof when the lock means 430 is appropriately operated by the key 432. Thus, the disc pair 450A and 450B, with the arrangement shown in the first row, permits a locking of the interlock means in the open position only (hence the code L.O. for lock open). In a like manner, the discs may be further rotated relative to one another to provide locking in the closed position (hence the code L.C. for lock closed) and further to provide locking in both the open and closed positions (hence the code L.O.C. for lock open and closed). This arrangement is highly advantageous in that since all discs are identical in design, it simply becomes a question of the manner in which each disc of a disc pair is oriented relative to the other member of a disc pair to form the desired lock open or lock closed features.

If it is desired to provide a specific installation with a manual charging means which is permanently in the manual operated position, such an arrangement as shown in FIGURE 6f, is provided wherein a spacer member 456 is positioned between the second shaft bearing 414 and the left hand face of clutch member 413 so as to permanently maintain the clutch member 413 in the position shown in FIGURE 6f in order to continuously and permanently place the spring operator means under control of the manual charging means which is operated through the handle arm 151.

FUSE OPERATED TRIPPING MEANS

The spring operator assembly of FIGURE 1, in addition to those features already described, may further be provided with a circuit breaker feature, namely, that of automatic tripping of the load interrupter switches upon the occurrence of severe short-circuit or overload current conditions. Such automatic tripping means are placed under control of fuses connected in series with the load interrupter switches.

One typical installation is shown in FIGURE 1 wherein the lower end of the switch blade 105 is electrically connected to a terminal strap 160. The terminal strap 160 is provided with a fuse clip 161 for receiving the upper end of a fuse member 162. The lower end of fuse member 162 is positioned between fuse clip 163 secured to lower terminal strap 164. In the arrangement shown in FIGURE 1, these series connected elements (i.e. the load interrupter switch and the fuse) are connected to the circuit by upper and lower terminal straps 165 and 164 respectively.

The fuse member 162 is provided with a projecting pin 162a at its lower end for controlling the actuation of a tripping arrangement 170 which is linked by means, not shown, in FIGURE 1, to the latch means 130 in order to initiate an opening operation when the fuse 162 blows due to either a short-circuit or overload current condition.

Turning to FIGURES 7a and 7b, the automatic tripping means is identified by the numeral 600, therein, and cooperates with a fuse member 601 which is provided with a pin 601a protruding from its lower end. The lower end of fuse 601 is positioned and secured by a fuse clip 602 rigidly fastened and electrically connected to terminal strap 603. Terminal strap 603 is provided with apertures 603a and 603b for connection to the circuit to be protected. A bracket 607 is secured to terminal strap 603 and has its upper edge 607a abutting the lower edge of fuse 601 so as to support the fuse 601 in a predetermined vertical position. The bracket 607 supports a shaft 605 through a suitable aperture provided therein, which shaft is also journalled to rotate in the cubicle wall 124. A U-shaped pin 604 is secured to shaft 605 and has its outermost tip 604a abutting projecting pin 601a shown in FIGURE 7a. Also rigidly secured to shaft 605 is a lever arm 609, the opposite end of which is pivotally linked at 610 to a connecting arm 611. Connecting arm 611 is a hollow tube connected at its opposite end by a fastening means 612 to an extension arm 613 which telescopes into tube 611 in order to adjust the overall length of tube 611 and extension arm 613 for controlling the automatic tripping operation. The opposite end of extension arm 613 is pivotally connected to triangular-shaped member 615 at 614. Triangular member 615 is pivoted at 616 to a flat plate 617 which is fastened to vertical plate 122 of the spring operator means 120 (see FIGURE 1) by fastening means 618 and 619. A spring member 620 is connected between plate 617 and triangular member 615 at 617a and 615a, respectively, and acts to bias triangular plate 615 in the counterclockwise direction about pivot 616. Triangular member 615 is further pivotally linked at 621 to a vertically aligned connecting rod 622 which is connected to the latch means 130 through a second triangular member 632, as shown in FIGURE 5b. The vertically aligned connecting rod 622 is pivoted to triangular member 632 by a pin at 625. Triangular member 632 is pivoted to the latch means by means of a pin at 624, which can best be seen in FIGURE 5b. The upper end of triangular member 632 is coupled by means of a pin at 629 to a horizontal connecting link 626. The opposite end of connecting link 626 is pivoted by a pin means at 627 to the latch release lever 517. The operation is such that when the fuse 601 blows, pin 601a, as shown in FIGURE 7a, moves downward causing arm 609 to rotate clockwise about its pivot. This motion is imparted through telescoping members 611 and 613 to triangular member 615, causing it to rotate clockwise about its pivot 616. This drives rod 622 in a downward vertical direction as shown by arrow 623, causing the upper end thereof, which is coupled to triangular member 632, to rotate member 632 in the counterclockwise direction. This causes link 626 to move in the direction shown by arrow 633, to draw the latch release member 517 counterclockwise about its pivot 517a so as to operate the latch release means in the same manner as previously described.

The operation of the tripping means is as follows:

Let it first be assumed that the spring operator means has been either manually or electrically charged to place the compressible springs in the spring charged to open position with the latch means 130 being positioned to prevent the occurrence of the opening operation.

Upon the occurrence of either a short circuit or overload condition, fuse 601 will blow either instantly or in accordance with an inverse time characteristic, thereby causing the pin 601a to move vertically downward to the dotted line position 601a'. This causes pin 604 to rotate clockwise to the dotted line position 604'. This clockwise rotation is imparted through lever arm 609 and telescoping members 611 and 613 to the vertical plate 615, causing it to rotate clockwise about its pivot 616. The clockwise rotation of plate 615 causes connecting rod 622 to move vertically downward in the direction shown by arrow 123. This downward movement of connecting link 622 causes triangular member 632 to pivot in the manner previously described, in order to operate the latch release member 517. This provides an automatic tripping operation under control of the blowing of fuse member 601 shown in FIGURES 7a and 7b.

While the above description has been limited to that of a tripping operation under the control of a single fuse member 601, it should be understood that in a polyphase system it is desirable to provide instantaneous tripping under control of any one of the fuses associated with each phase of the polyphase system. While not shown in the drawings, this can very simply be carried out by extending shaft 605 to the right, as shown by arrow 624, so that the shaft 605 is positioned beneath each fuse of the polyphase system. The shaft is then provided with additional pins 604 which are positioned to be under the control of the projecting pins 601a of each fuse in the polyphase system, so that any one of these fuses may initiate the tripping operation. Upon the blowing of any fuse in the polyphase system, this causes the rotation of arm 609 which initiates the tripping operation in the same manner as previously described.

ELECTRICAL SYSTEM FOR SPRING OPERATOR ASSEMBLY

The electrical system employed in the instant invention is dependent upon the number of modules employed in the ultimate system. FIGURE 8a shows the schematic diagram 800 of the electrical system utilized when employing a motor charging means in the overall assembly. The electrical system is comprised of a voltage source 801, which may be either a D.C. or A.C. voltage source. Connected in series with the voltage source are first and second contact pairs 802 and 803, which are in the normally closed condition. Contact pair 802 is mechanically coupled to the handle operating means, such that when the locks of the handle operating means are locked in either the opened or closed position this opens contact pair 802 through a suitable mechanical linkage (not shown), in order to isolate the power source 801. Contact pair 803 is mechanically coupled by means (not shown) to the handle means 151 of the manual charging means 150, so that when the handle means 151 is depressed, contact pair 803, which is normally in the closed condition, moves to the opened condition so as to again isolate the power source 801. This is done to prevent operation of the motor charging means, for a purpose to be more fully described.

Contact pairs 804a and 804b are normally opened and normally closed contact pairs respectively, and are coupled by suitable mechanical linkage to the switch mechanism shaft 114 or link 116, so that contact pair 804a is in the closed condition when the load interrupting switch is closed and is in the opened condition when the load operating switch is opened. Contact pair 804b operates in the reverse manner, such that the contact pair is opened when the load interrupter switch is closed, and is closed when the load interrupter switch is opened. 806 represents a red light, which is energized when the switch is in the closed position; 811 represents a green light which is energized when the switch is in the opened position, and numerals 805 and 808 represent the trip and close buttons respectively.

Numeral 320 is the solenoid of the motor charging means of FIGURES 3a–3c and 4, while numeral 360 is the motor of the motor-charging means. Numeral 300' represents the resistivity in the circuit of the motor charging means. Normally closed contact pair 330 represents the microswitch of FIGURE 3a which is in the normally closed position, as previously described.

The operation of circuit 800 is as follows:

Let it be assumed that the handle 151 of the manual charging means has not been depressed, and the locks provided in the manual charging means have not been operated to lock the assembly in either the opened or closed position. This means that contact pairs 802 and 803 will be in the closed condition, so as to connect terminal 815 to energy source 801. Let it be assumed that the load interrupter switches at this particular time are in the closed position, and it is desired to operate them to the opened position. With the load interrupter switches in the closed position, contact pair 804a is in the closed condition while contact pair 804b is in the opened state. This establishes a current path from terminal 815 through contact pair 804a, and red lamp 806 to the opposite terminal of energy source 801. The energization of red lamp 806 indicates the fact that the load interrupter switches are in the closed condition. Contact pair 804b being opened isolates green bulb 811 from energy source 801. Contact pair 330, which is the microswitch 330 of FIGURE 3a, is in the normally closed position. In order to initiate the tripping operation, trip button 805 is closed, closing the contact pair and establishing the first current path from terminal 815 through contact pair 330 to energy source 801. The energization of coil 807 causes contact pair 807' operated by coil 807 to move to the closed condition, thus providing a lock-in feature. This establishes a current path from terminal 815 through closed contact pair 807', coil 807 and closed-contact pair 330. Thus, if a trip button 805 is released, the current path nevertheless is retained due to the energization of coil 807. A second current path, immediately established upon depression of trip button 805, is that containing the resistive element 300' and motor means 300. This energizes the motor means 300, causing the motor charging operation to be initiated. The third current path is through the motor-ratchet solenoid 320, which causes the ratchet means to be advanced beyond the missing tooth region, so as to permit the motor-charging operation to be performed. The motor remains energized until microswitch 330 has its contacts moved to the opened state under control of the cam 319 shown in FIGURE 3a, which opens the microswitch when the charging springs have reached their fully charged position. This opens the current path containing coil 807, causing contact pair 807' to return to the normally opened condition. This thereby isolates motor 300 and ratchet moving solenoid 320 to terminate the motor-charging operation.

Let it now be assumed that the load-interrupter switches are in the opened condition. In this position, contact pair 804b remains in the closed state, while contact pair 804a remains in the open state. This establishes a current path from source 801 through closed contact pairs 802, 803 and 804b to green bulb 811, which becomes energized to indicate the fact that the load-interrupter switches are in the opened condition. By depression of the close button 808, this establishes current paths through ratchet-advancing solenoid 320, motor means 300 and coil 807; microswitch 330 being in the closed position at this time; coil 807 becoming energized closes its contacts 807' to maintain the closed circuit condition even if the close button 808 is released. The motor-charging operation takes place until the cam means 319 causes microswitch 330 to move to the opened state. This deenergizes relay coil 807 to move contacts 807' to the opened condition. When contacts 807' disengage, this isolates current from the coil 807, motor 300 and the ratchet-advancing solenoid 320.

In assemblies where automatic operation of the latch means 130 is desired, but no motor charging means 140 is employed, the circuit 830 of FIGURE 8c is employed as the electrical system for the assembly. It should be noted that like elements are designated by like numerals relative to FIGURE 8a. In the circuit 830 of FIGURE 8c, let it be assumed that the load interrupter switches are in the closed position. In this position, contact pair 804a are in the closed condition and contact pair 804b are in the opened condition. This establishes a current path from voltage source 801 through contact pairs 802, 803 and 804a to red bulb 806. The energization of red bulb 806 indicates that the load interrupter switches are closed. By depression of the trip button 805, this establishes a current path through the solenoid 539, which is also shown in FIGURES 5a and 5b. The energization of solenoid 539 operates the latch release mechanism to move the latch member engaging lever arm 116 out of engagement therewith so as to permit the tripping operation. As soon as the tripping operation occurs, this puts the load interrupter switches in the opened condition so as to open contact pair 804a and close contact pair 804b. This removes energization from the trip coil 539 and red lamp 806, and also connects energy source 801 to green lamp 811, which when energized indicates the fact that the load interrupter switches are in the opened state. In order to provide an indication that the charging spring is in the charged position, contact pair 810 is coupled to suitable mechanical linkage to the charging spring means so as to be moved to the closed condition when the springs are in the fully charged position. This establishes a current path from the voltage source 801 to a yellow lamp 832, which is energized to indicate the fact that the charging means is in the charged condition, to indicate the fact that an automatic tripping or closing operation can be performed (depending upon the state of the load interrupter switches at that time).

If it is now desired to perform a closing operation and if the spring means is in the spring charged-to-close condition, contact pair 810 will be in the closed position to energize yellow lamp 832. Also, contact pair 804b is in the closed condition, and contact pair 804a is in the opened condition. This lights green lamp 811 to indicate that the load interrupter switches are in the opened position. The close button 808 is then depressed so as to energize the solenoid 539 in order to release the latch mechanism 130. As soon as the load interrupter switches reach the closed state, contact pair 804b opens and contact pair 804a closes, causing the green lamp 811 to be deenergized and causing the red lamp 806 to be energized to indicate the fact that the load interrupter switches are now in the closed condition. In addition thereto, solenoid 539 is deenergized; since even though the close button 808 may still be depressed, there is no current path therethrough due to the fact that contact pair 804b is moved to the opened state.

Circuit 850 is employed in assemblies which are designed to include both the motor charging means 140 and the latch means 130.

If the handle 151 is not depressed, and the handle locks are not locked in either the opened or closed position, contact pairs 802 and 803 of circuit 850 are in the closed condition. If the springs are not in the charged condition, microswitch 330 is in the closed position, and if the springs are not in the charged-to-close or charged-to-open condition, contact pair 810 is in the closed condition, thus energizing relay coil 807. The energization of relay coil 807 causes contact pair 807' to move to the closed condition. This connects the motor means 300 and the ratchet-advancing solenoid 320 to the energy source 801, causing the motor charging operation to occur. When the springs reach the fully charged condition, microswitch 330 moves to the opened condition to deenergize relay 807, causing contact pair 807' to move to the opened condition. This completes the charging operation. The tripping or closing operations are substantially the same as those described relative to the arrangement of FIGURE 8c, with depression of the tripping or closing buttons 805 or 808 in the same manner as previously described.

The electrical circuits 800, 830 and 850 of FIGURES 8a, 8c and 8b, respectively, are designed as modular plug-in- units, which may be readily plugged-in to the assembly with the selection of the appropriate modular unit being dependent strictly upon the number of other modular components included in the overall system. For example, if only a motor charging means and no latch means is to be provided in the assembly, the modular plug-in unit 800 will be employed. If both latch means 130 and motor-charging means 140 are to be included in the assembly, the plug-in unit of 850 will be employed; whereas if the latch means is to be included in the assembly without the inclusion of motor-charging means, the plug-in circuit of figure 830 will be employed.

It can be seen from the foregoing that the manual charging means may be readily incorporated with a spring operator installation so as to provide manual charging capabilities at such an installation. In addition thereto, either or both of the interlocking arrangements may be added to the manual charging means to provide still further capabilities. The design of the manual charging means is such that it may be readily added to an already installed assembly with relative ease so as to provide an installation with further capabilities which it did not desire at the time that the initial installation was made.

It can be seen from the foregoing that the instant invention provides a spring operator arrangement having subassemblies, each of which are modular in design to enable swift and ready assembly between and among these modular design devices to provide a spring operator structure having as many or as few capabilities and features as is desired by the user. In addition thereto, each of these modular devices may be installed in the field or in the factory and may further be added to an already installed system so as to increase its capabilities at any date after its initial installation whereby such modifications can be made swiftly and readily.

Although there has been described a preferred embodiment of this novel invention, many variations and modifications will now be apparent to those skilled in the art. Therefore, this invention is to be limited, not by the specific disclosure herein, but only by the appending claims.

I claim:

1. Manual charging means for charging a spring operator means having compressible spring means comprising; a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing side wall; one side of said shaft bearing engaging said clutch plate; a portion of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned at the perimeter of said cavity; said clutch plate having an arcuate shaped projection along one portion of its periphery to permit seating of said clutch plate in said cavity in only one predetermined position; rotation of said handle arm imparting rotation to said sprocket wheel assembly only when said clutch plate is properly seated in said cavity.

2. Manual charging means for charging a spring operator means having compressible spring means comprising; a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing sidewall; one side of said shaft bearing engaging said clutch plate; a portion of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned substantially along one half of the perimeter of said cavity; said clutch plate having an arcuate shaped projection along one portion of its periphery to permit seating of said clutch plate in said cavity in only one predetermined position, said sprocket wheel assembly being free to rotate in one direction without engaging said arcuate projection of said clutch plate when said clutch plate is seated in said one predetermined position; rotation of said handle arm in the other direction imparting rotation to said sprocket wheel assembly only when said clutch plate is properly seated in said cavity; spring means mounted upon said shaft first portion and having its first and second ends abutting said clutch plate and said sprocket wheel assembly respectively to normally urge said clutch plate away from said cavity enabling said handle arm and said sprocket wheel assembly to rotate independently.

3. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing sidewall; one side of said shaft bearing engaging said clutch plate; a portion of said shaft bearing extending beyond said one housing sidewall; a rotatable handle arm having a square-shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned at the perimeter of said cavity; said clutch plate having an arcuate shaped projection along one portion of its periphery to permit seating of said clutch plate in said cavity in only one predetermined position; rotation of said handle arm imparting rotation to said sprocket wheel assembly only when said clutch plate is properly seated in said cavity; spring means mounted upon said shaft first portion and having its first and second ends abutting said clutch plate and said sprocket wheel assembly to normally urge said clutch plate away from said cavity enabling said handle arm and said sprocket wheel assembly to rotate independently; said housing having a notch for receiving one end of said handle arm when said clutch plate is seated in said cavity to restrain said spring means from separating said clutch plate from said cavity when said handle is rotated.

4. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing side wall; one side of said shaft bearing engaging said clutch plate; a portion of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned substantially along one half of the perimeter of said cavity; said clutch plate having an arcuate shaped projection along one portion of its periphery to permit seating of said clutch plate in said cavity in only one predetermined position, said sprocket wheel assembly being free to rotate in one direction without engaging said arcuate projection of said clutch plate when said clutch plate is seated in said one predetermined position; rotation of said handle arm imparting rotation to said sprocket wheel assembly in the other direction only when said clutch plate is properly seated in said cavity; an indicator ring surrounding said sprocket wheel assembly; said housing having an opening for viewing a portion of said indicator ring; said indicator ring being color-coded to facilitate the reading of said indicator ring in determining the position of said spring operator means.

5. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing side wall; one side of said shaft bearing engaging said clutch plate; a portion of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned substantially along one half of the perimeter of said cavity; said clutch plate having an arcuate shaped projection along one portion of its periphery to permit seating of said clutch plate in said cavity in only one predetermined position, said sprocket wheel assembly being free to rotate in one direction without engaging said arcuate projection of said clutch plate when said clutch plate is seated in said one predetermined position; rotation of said handle arm in the other direction imparting rotation to said sprocket wheel assembly only when said clutch plate is properly seated in said cavity; and interlock means for locking said sprocket wheel in a plurality of predetermined positions.

6. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing side wall; one side of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned at the perimeter of said cavity; said clutch plate having an arcuate shaped projection along one portion of its periphery to permit seating of said clutch plate in said cavity in only one predetermined position; rotation of said handle arm imparting rotation to said sprocket wheel assembly when said clutch plate is properly seated in said cavity; interlock means for locking said sprocket wheel in a plurality of predetermined positions; said interlock means comprising first and second discs keyed to rotate about said shaft in unison with each other and with said sprocket wheel assembly; each of said discs having at least one notch at its periphery; key operated locking means having a reciprocally mounted plunger; said discs being mounted adjacent one another; said plunger being positionable within said notches when said notches of said discs are in angular alignment to permit locking of said sprocket wheel assembly in a predetermined position.

7. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing side wall; one side of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned at the perimeter of said cavity; said clutch plate having an arcuate shaped projection along one portion of its periphery to permit seating of said clutch plate in said cavity in only one predetermined position; rotation of said handle arm imparting rotation to said sprocket wheel assembly only when said clutch plate is properly seated in said cavity; interlock means for locking said sprocket wheel in a plurality of predetermined positions; said interlock means comprising first and second discs keyed to rotate about said shaft in unison with each other and with said sprocket wheel assembly; each of said discs having at least one notch at its periphery; key operated locking means having a reciprocally mounted plunger; said discs being mounted adjacent one another; said plunger being positionable within said notches when said notches of said discs are in angular alignment to permit locking of said sprocket wheel assembly in a predetermined position; each of said discs having three notches spaced at ninety degree (90°) intervals; said discs being adapted to be aligned relative to one another to place as many as all three notches or as few as one notch in alignment.

8. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journalled to rotate in said one housing side wall; one side of said shaft bearing engaging said clutch plate; a portion of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned at the perimeter of said cavity; said clutch plate having an arcuate shaped projection along one portion of its periphery to permit seating of said clutch plate in said cavity in only one predetermined position; rotation of said handle arm imparting rotation to said sprocket wheel assembly only when said clutch plate is properly seated in said cavity; interlock means for locking said sprocket wheel in a plurality of predetermined positions; said interlock means comprising first and second discs keyed to rotate about said shaft in unison with each other and with said sprocket wheel assembly; third and fourth discs keyed to rotate about said shaft in unison with each other and with said sprocket wheel assembly; each of said discs having at least one notch at its periphery; first and second key operated locking means each having a reciprocally mounted plunger; said first and second discs being mounted adjacent one another; said third and fourth discs being mounted adjacent one another and at a spaced interval from said first and second discs; said plungers being positionable within said notches when said notches of said discs are in angular alignment to permit locking of said sprocket wheel assembly in a predetermined position.

9. Manual charging means for charging a spring operator means having compressible spring means comprising: a housing; a first shaft journaled to rotate in said housing; one end of said shaft extending beyond one side wall of said housing, said one end of said shaft being of substantially square cross-section; the remaining portion of said shaft being of circular cross-section; a clutch plate having a square shaped aperture slidably mounted about the first portion of said shaft and being positioned within said housing; a shaft bearing having a square shaped opening slidably mounted upon said shaft first portion and being journaled to rotate in said one housing side wall; one side of said shaft bearing engaging said clutch plate; a portion of said shaft bearing extending beyond said one housing sidewall; a rotatable handle arm having a square shaped opening slidably mounted upon said shaft first portion; a sprocket wheel assembly having a circular opening mounted to said shaft second portion and being adapted to rotate independently of said shaft; a chain drive linking said sprocket wheel assembly to said spring operator means; said sprocket wheel assembly having a cavity at one end thereof for receiving said clutch plate; a substantially C-shaped projection positioned at the perimeter of said cavity; said clutch plate having an arcuate shaped projection along one portion of its periphery to permit seating of said clutch plate in said cavity in only one predetermined position; rotation of said handle arm imparting rotation to said sprocket wheel assembly only when said clutch plate is properly seated in said cavity; interlock means for locking said sprocket wheel in a plurality of predetermined positions; said interlock means comprising first and second discs keyed to rotate about said shaft in unison with each other and with said sprocket wheel assembly; third and fourth discs keyed to rotate about said shaft in unison with each other and with said sprocket wheel assembly; each of said discs having at least one notch at its periphery; first and second key operated locking means each having a reciprocally mounted plunger; said first and second discs being mounted adjacent one another; said third and fourth discs being mounted adjacent one another and at a spaced interval from said first and second discs; said plungers being positionable within said notches when said notches of said discs are in angular alignment to permit locking of said sprocket wheel assembly in a predetermined position; each of said discs having three notches spaced at ninety degree (90°) intervals; said discs being adapted to be aligned relative to one another to place as many as all three notches or as few as one notch in alignment.

References Cited by the Examiner

UNITED STATES PATENTS

| | | | |
|---|---|---|---|
| 1,098,189 | 5/1914 | Stocker | 192—67 X |
| 1,341,796 | 6/1920 | Gorman | 192—67 |
| 1,427,654 | 8/1922 | Thiell | 192—67 X |
| 1,511,651 | 10/1924 | Brake | 192—114 |
| 1,545,050 | 7/1925 | Hansen | 192—67 |
| 1,690,356 | 11/1928 | Zubaty | 192—67 X |
| 1,899,660 | 2/1933 | Becker | 192—67 X |
| 2,578,837 | 12/1951 | Raney | 188—69 |
| 2,592,819 | 4/1952 | Moessinger | 192—67 |
| 2,718,150 | 9/1955 | Elliott | 74—10.2 |
| 2,841,454 | 7/1958 | Ceramie | 192—67 X |
| 3,005,528 | 10/1961 | Doble et al. | 192—67 X |

DON A. WAITE, *Primary Examiner.*

MILTON KAUFMAN, BROUGHTON G. DURHAM,
*Examiners.*

UNITED STATES PATENT OFFICE
Certificate of Correction

Patent No. 3,235,044　　　　　　　　　　　　　　　　　　　February 15, 1965
Sigurd O. Rodeseike

It is hereby certified that error appears in the above numbered patent requiring correction and that the said Letters Patent should read as corrected below.

In the drawings, FIGS. 2a, 2b and 2c were inadvertently omitted and should appear as shown below:

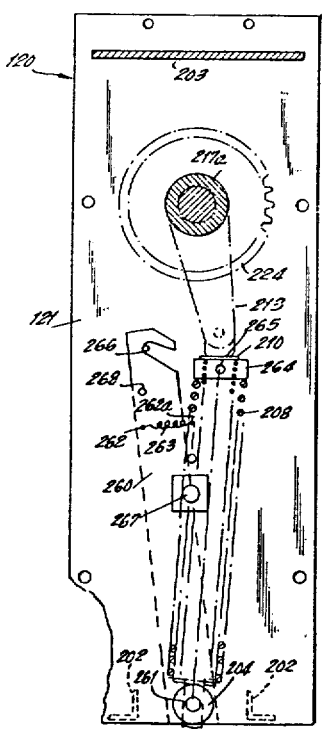
FIG. 2a

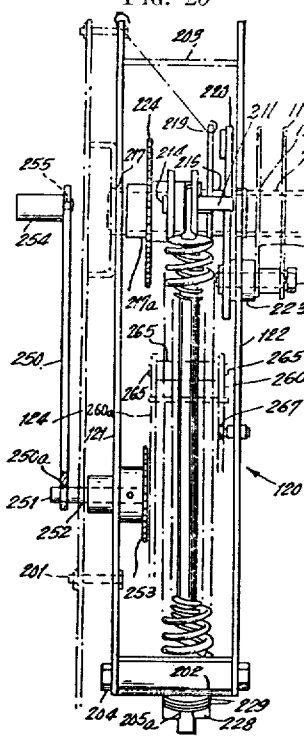
FIG. 2b

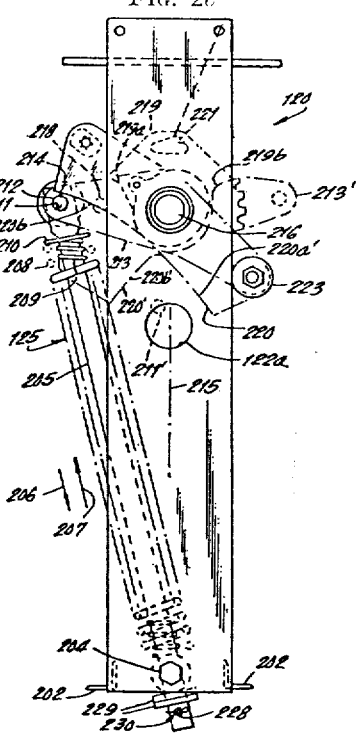
FIG. 2c

Signed and sealed this 10th day of October 1967.

[SEAL]
Attest:
EDWARD M. FLETCHER, JR.,
*Attesting Officer.*

EDWARD J. BRENNER,
*Commissioner of Patents.*